US011635953B2

(12) United States Patent
Crane et al.

(10) Patent No.: US 11,635,953 B2
(45) Date of Patent: Apr. 25, 2023

(54) PROACTIVE NOTIFICATIONS FOR ROBOTIC PROCESS AUTOMATION

(71) Applicant: ServiceNow, Inc., Santa Clara, CA (US)

(72) Inventors: Jonathan Crane, San Diego, CA (US); Praveen Minnikaran Damodaran, Hyderabad (IN); Eric Schroeder, San Diego, CA (US); Binny Bhatnagar, Pleasanton, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/314,360

(22) Filed: May 7, 2021

(65) Prior Publication Data

US 2022/0357940 A1    Nov. 10, 2022

(51) Int. Cl.
    *G06F 8/65*    (2018.01)
    *H04L 67/12*   (2022.01)

(52) U.S. Cl.
    CPC .............. *G06F 8/65* (2013.01); *H04L 67/12* (2013.01)

(58) Field of Classification Search
    CPC ..... G06F 8/65; G06F 8/71; G06F 8/20; G06F 11/36; H04L 67/12
    See application file for complete search history.

(56) References Cited

U.S. PATENT DOCUMENTS 4,941,084 A    7/1990 Terada et al.
5,185,860 A    2/1993 Wu
(Continued)

FOREIGN PATENT DOCUMENTS

EP    0433979    6/1991
EP    1607824    12/2005
(Continued)

OTHER PUBLICATIONS

"Quebec Now Platform Capabilities," ServiceNow, Inc., Apr. 8, 2021.
"Robotic process automation," Wikipedia, https://en.wikipedia.org/wiki/Robotic_process_automation, Mar. 30, 2021.
U.S. Appl. No. 14/678,775, filed Apr. 3, 2015.
U.S. Appl. No. 16/844,471, filed Apr. 9, 2020.
(Continued)

*Primary Examiner* — S. Sough
*Assistant Examiner* — Cheneca Smith
(74) *Attorney, Agent, or Firm* — McDonnell Boehnen Hulbert & Berghoff LLP

(57) ABSTRACT

An example embodiment involves persistent storage defining a first configuration item representing an application deployed within a network, a second configuration item representing a software program that is deployable within the network, and a relationship between the first configuration item and the second configuration item. One or more processors may be configured to: (i) receive an indication that a change has been applied to the application or has been arranged to be applied to the application; (ii) identify the relationship between the first configuration item and the second configuration item; (iii) based on the relationship between the first configuration item and the second configuration item, determine that the change can affect operation of the software program; and (iv) in response to determining that the change can affect operation of the software program, provide a notification of the change to an agent associated with the software program.

18 Claims, 18 Drawing Sheets

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,527,814 B1 | 9/2013 | Elwell et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,098,555 B2 | 8/2015 | Bjork et al. |
| 10,079,730 B2 | 9/2018 | Subramanian et al. |
| 11,157,390 B2 | 10/2021 | Acharyya et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088675 A1 | 4/2009 | Baier et al. |
| 2009/0228984 A1 | 9/2009 | Sterin |
| 2010/0110932 A1 | 5/2010 | Doran et al. |
| 2012/0016706 A1 | 1/2012 | Pargaonkar et al. |
| 2012/0151272 A1 | 6/2012 | Behrendt et al. |
| 2015/0205596 A1* | 7/2015 | Hiltegen ............ G06F 9/45558 717/172 |
| 2018/0123940 A1 | 5/2018 | Rimar et al. |
| 2018/0239682 A1* | 8/2018 | Kaluza ................ G06F 11/3006 |
| 2018/0370033 A1 | 12/2018 | Geffen et al. |
| 2019/0065343 A1 | 2/2019 | Li et al. |
| 2019/0104398 A1 | 4/2019 | Owen et al. |
| 2019/0268244 A1* | 8/2019 | Blakeman ........... H04L 41/0813 |
| 2020/0233862 A1* | 7/2020 | Shaked ................ G06F 40/284 |
| 2020/0313953 A1* | 10/2020 | Simeonov ............ H04L 41/082 |
| 2022/0012602 A1* | 1/2022 | Kataria ................ G06F 11/302 |
| 2022/0229720 A1 | 7/2022 | Kantharaj et al. |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

U.S. Appl. No. 16/149,668, filed Oct. 2, 2018.
U.S. Appl. No. 16/223,763, filed Dec. 18, 2018.
U.S. Appl. No. 16/843,023, filed Apr. 8, 2020.
U.S. Appl. No. 14/269,236, filed May 5, 2014.
U.S. Appl. No. 14/634,146, filed Feb. 27, 2015.
U.S. Appl. No. 15/859,547, filed Dec. 31, 2017.
U.S. Appl. No. 15/419,770, filed Jan. 30, 2017.
U.S. Appl. No. 12/188,255, filed Aug. 8, 2008.
U.S. Appl. No. 10/109,277, filed Mar. 28, 2002.
U.S. Appl. No. 14/459,857, filed Aug. 14, 2014.
U.S. Appl. No. 13/862,567, filed Apr. 15, 2013.
U.S. Appl. No. 15/345,246, filed Nov. 7, 2016.
U.S. Appl. No. 16/224,219, filed Dec. 18, 2018.

(56) References Cited

OTHER PUBLICATIONS

U.S. Appl. No. 16/834,036, filed Mar. 30, 2020.
U.S. Appl. No. 16/579,001, filed Sep. 23, 2019.
U.S. Appl. No. 13/965,535, filed Aug. 13, 2013.
U.S. Appl. No. 15/864,578, filed Jan. 8, 2018.
U.S. Appl. No. 15/057,882, filed Mar. 1, 2016.
U.S. Appl. No. 11/572,904, filed Mar. 19, 2007.
Office Action from U.S. Appl. No. 17/314,354, dated Sep. 20, 2022.

* cited by examiner

700

Thu, 01 Apr 2021 15:53:29: rpa_bot1: auth success 10.0.2.2 ssh userid admin
Thu, 01 Apr 2021 15:58:29: rpa_bot1: auth success 10.0.2.2 ssh userid admin
Thu, 01 Apr 2021 16:03:29: rpa_bot1: auth success 10.0.2.2 ssh userid admin
Thu, 01 Apr 2021 16:08:29: rpa_bot1: auth success 10.0.2.2 ssh userid admin
Thu, 01 Apr 2021 16:13:29: rpa_bot1: auth success 10.0.2.2 ssh userid admin
Thu, 01 Apr 2021 16:18:29: rpa_bot1: auth failure 10.0.2.2 ssh userid admin
Thu, 01 Apr 2021 16:23:29: rpa_bot1: auth failure 10.0.2.2 ssh userid admin
Thu, 01 Apr 2021 16:28:29: rpa_bot1: auth failure 10.0.2.2 ssh userid admin
...
Fri, 02 Apr 2021 15:53:29: rpa_bot1: auth success 10.0.2.2 ssh userid admin
Fri, 02 Apr 2021 15:58:29: rpa_bot1: auth success 10.0.2.2 ssh userid admin
Fri, 02 Apr 2021 16:03:29: rpa_bot1: auth success 10.0.2.2 ssh userid admin
Fri, 02 Apr 2021 16:08:29: rpa_bot1: auth success 10.0.2.2 ssh userid admin
Fri, 02 Apr 2021 16:13:29: rpa_bot1: auth success 10.0.2.2 ssh userid admin
Fri, 02 Apr 2021 16:18:29: rpa_bot1: error - server unreachable 10.0.2.2
Fri, 02 Apr 2021 16:23:29: rpa_bot1: error - server unreachable 10.0.2.2
Fri, 02 Apr 2021 16:28:29: rpa_bot1: error - server unreachable 10.0.2.2

FIG. 7

| FAILURE TYPE | DESCRIPTION | BOT NAME | CORRESPONDENT NODE ADDRESS | REPAIR SCRIPT |
| --- | --- | --- | --- | --- |
| 1 | AUTH FAILURE | RPA_BOT1 | 10.0.2.2 | REFRESH CREDENTIALS |
| 2 | SERVER UNREACHABLE | RPA_BOT1 | 10.0.2.2 | UPDATE SERVER ADDRESSES |

| NUMBER | CHG0040007 |
| REQUESTED BY | SYSTEM ADMIN |
| CATEGORY | SERVER REBOOT |
| CONFIGURATION ITEM | DIRECTORY SERVICE |
| SHORT DESCRIPTION | APPLY LATEST PATCHES TO ON-PREMISE DIRECTORY SERVER |

1302

| TYPE | EMERGENCY |
| PRIORITY | 1 - CRITICAL |
| RISK | MODERATE |
| IMPACT | 1 - HIGH |

RELATED CONFIGURATION ITEMS ← 1304

USED BY: CREATE USER BOT
USED BY: ADD USER TO GROUP BOT
USED BY: CHANGE USER PERMISSIONS

FIG. 13A

PROACTIVE NOTIFICATIONS FOR ROBOTIC PROCESS AUTOMATION

BACKGROUND

Robotic process automation (RPA) can be used within computing systems to automate certain routine or repetitive tasks, such as scanning documents for keywords or phrases, sorting data into categories, moving files from one location to another, obtaining information from or writing information to a server or database, generating analytics, and so on. The motivation for RPA is largely in its ability to offload mundane work from various individuals. In this way, these individuals can spend more time on higher-level complex tasks that are more difficult or impossible to automate. In some cases, RPA may involve a degree of artificial cognition (e.g., by employing machine learning models) in order to make predictions or classifications.

Thus, enterprises and other organizations have been deploying software "bots" (e.g., programs, scripts, etc.) to carry out these tasks. It has been observed, however, that bots often fail at a rate that is higher than expected. This is frequently due to the bots being programmed based on the assumption of a static environment. In practice, computing systems and networks are dynamic, with data being moved about, services being modified, and devices being placed in and taken out of production. Consequently, the gain resulting from bots taking on the work done by some individuals can be offset by the loss associated with having other individuals debug, correct, and otherwise manage the bots.

SUMMARY

The embodiments herein may overcome these and potentially other technical problems by providing predictions regarding the operation of bots within a computing system or network. The predictions are automatically generated, possibly based on trained machine models. When a bot is predicted to be in a failure state or likely to fail, a set of expert system rules are applied to determine how to correct the bot's behavior. If the bot cannot be corrected, an alert is supplied to a human agent who can then investigate further and manually address the issue.

The embodiments may further involve maintaining records of bots (possibly in the form of configuration items) in a configuration management database (CMDB). These records may be linked to records representing software, devices, and services of the computing system or network. In this manner, a human agent who is considering making modifications to such software, devices, and services is able to determine the impacted bots. As such, the human agent can then determine whether the changes can be made in a way that eliminates or mitigates this impact, or if the bots can be reconfigured to perform as expected on the system as modified. Likewise, a human agent who is testing, debugging, or considering root cause of a bot failure may be able to rapidly identify the software, devices, and services that the bot uses. Then, the human agent may be able to focus his or her analysis on the bot's interaction with these components.

Accordingly, a first example embodiment may involve persistent storage containing rules related to repairing software programs (bots) in a network, wherein the rules associate indications of software program failures with repair applications that are configured to correct corresponding software program failures. One or more processors may be configured to: (i) receive, by a predictive model, a representation of an execution history of a particular software program of the software programs, wherein the predictive model has been trained on a corpus of execution histories of the software programs in order to be able to estimate root causes of software program failures; (ii) generate, by the predictive model and from the execution history, a failure prediction for the particular software program, the failure prediction including an estimated root cause; (iii) receive, by an automated repair controller application, the failure prediction from the predictive model; (iv) possibly based on applying the rules to the failure prediction, determine, by the automated repair controller application, a repair application from the repair applications that is configured to correct the estimated root cause; and (v) cause, by the automated repair controller application, the repair application to be executed within the network.

A second example embodiment may involve receiving, by a predictive model, a representation of an execution history of a particular software program (bot), wherein the predictive model has been trained on a corpus of execution histories of software programs in order to be able to estimate root causes of software program failures, wherein persistent storage contains rules related to repairing software programs in a network, and wherein the rules associate indications of software program failures with repair applications that are configured to correct corresponding software program failures. The second example embodiment may also involve generating, by the predictive model and from the execution history, a failure prediction for the particular software program, the failure prediction including an estimated root cause. The second example embodiment may also involve receiving, by an automated repair controller application, the failure prediction from the predictive model. The second example embodiment may also involve, possibly based on applying the rules to the failure prediction, determining, by the automated repair controller application, a repair application from the repair applications that is configured to correct the estimated root cause. The second example embodiment may also involve causing, by the automated repair controller application, the repair application to be executed within the network.

A third example embodiment may involve persistent storage defining a first configuration item representing an application deployed within a network, a second configuration item representing a software program (bot) that is deployable within the network, and a relationship between the first configuration item and the second configuration item, wherein the relationship indicates that the software program uses the application and that the application is used by the software program. One or more processors may be configured to: (i) receive an indication that a change has been applied to the application or has been arranged to be applied to the application; (ii) possibly in response to receiving the indication that the change has been applied to the application or has been arranged to be applied to the application, identify the relationship between the first configuration item and the second configuration item; (iii) possibly based on the relationship between the first configuration item and the second configuration item, determine that the change can affect operation of the software program; and (iv) possibly in response to determining that the change can affect operation of the software program, provide a notification of the change to an agent associated with the software program.

A fourth example embodiment may involve receiving an indication that a change has been applied to an application deployed within a network or has been arranged to be applied to the application, wherein persistent storage defines a first configuration item representing the application, a second configuration item representing a software program (bot) that is deployable within the network, and a relationship between the first configuration item and the second configuration item, wherein the relationship indicates that the software program uses the application and that the application is used by the software program. The fourth example embodiment may also involve, possibly in response to receiving the indication that the change has been applied to the application or has been arranged to be applied to the application, identifying the relationship between the first configuration item and the second configuration item. The fourth example embodiment may also involve, possibly based on the relationship between the first configuration item and the second configuration item, determining that the change can affect operation of the software program. The fourth example embodiment may also involve, possibly in response to determining that the change can affect operation of the software program, providing a notification of the change to an agent associated with the software program.

In a fifth example embodiment, an article of manufacture may include a non-transitory computer-readable medium, having stored thereon program instructions that, upon execution by a computing system, cause the computing system to perform operations in accordance with the first, second, third, and/or fourth example embodiment.

In a sixth example embodiment, a computing system may include at least one processor, as well as memory and program instructions. The program instructions may be stored in the memory, and upon execution by the at least one processor, cause the computing system to perform operations in accordance with the first, second, third, and/or fourth example embodiment.

In a seventh example embodiment, a system may include various means for carrying out each of the operations of the first, second, third, and/or fourth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts a log file, in accordance with example embodiments.

FIG. 8 depicts a set of domain knowledge rules, in accordance with example embodiments.

FIG. 13A depicts a graphical user interface representing configuration item relationships used in workflows, in accordance with example embodiments.

DETAILED DESCRIPTION

Figure 1:
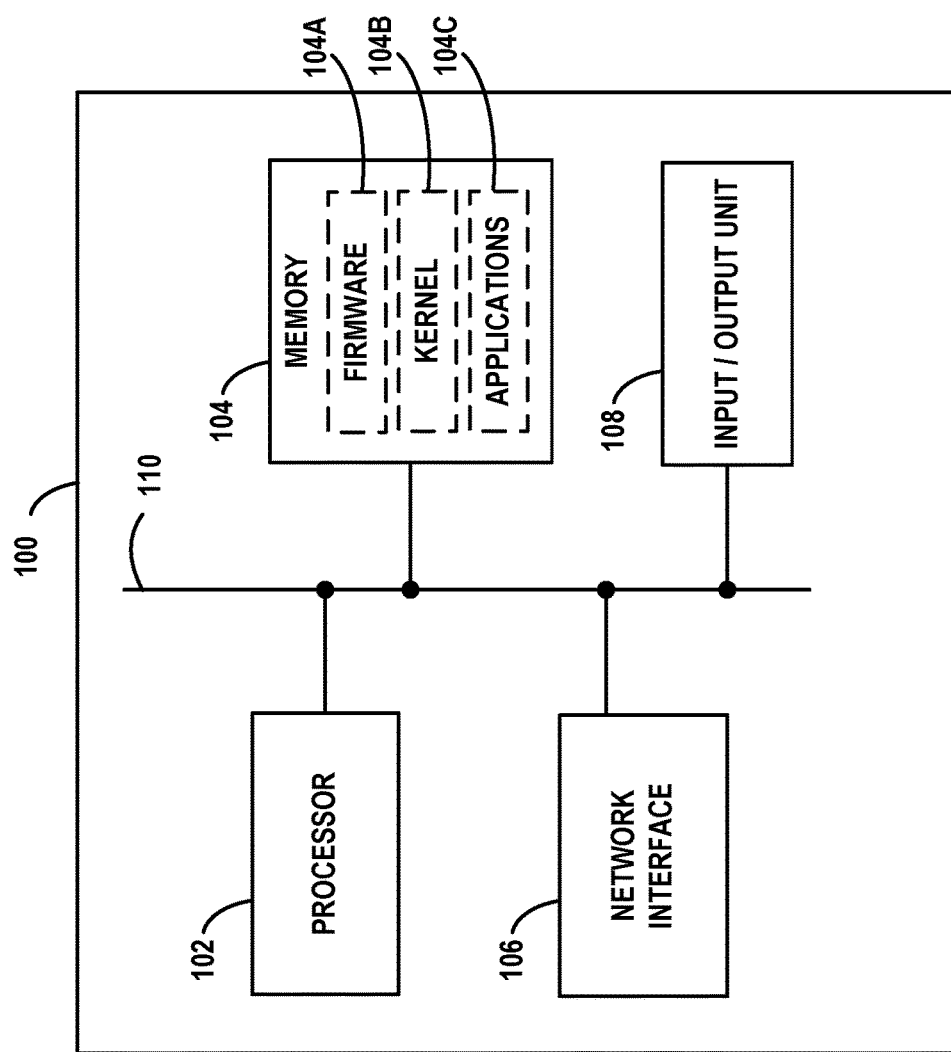
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
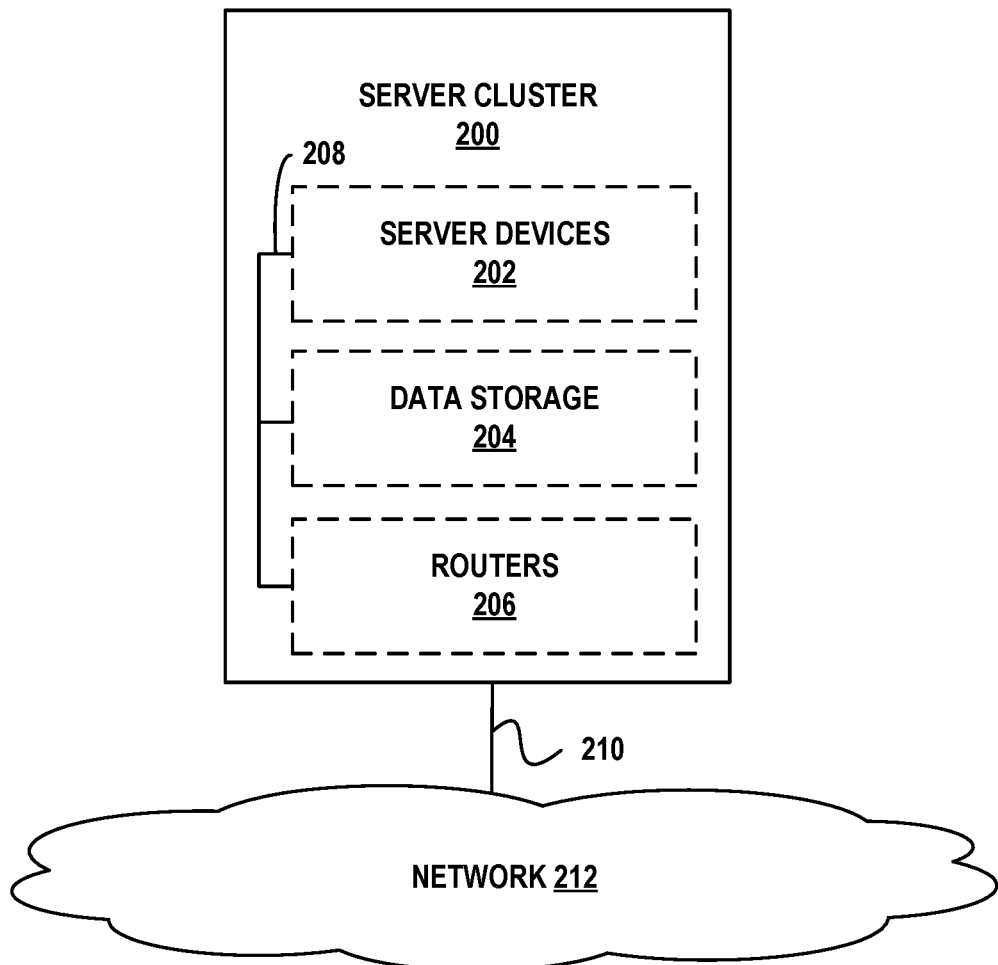
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i)

network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
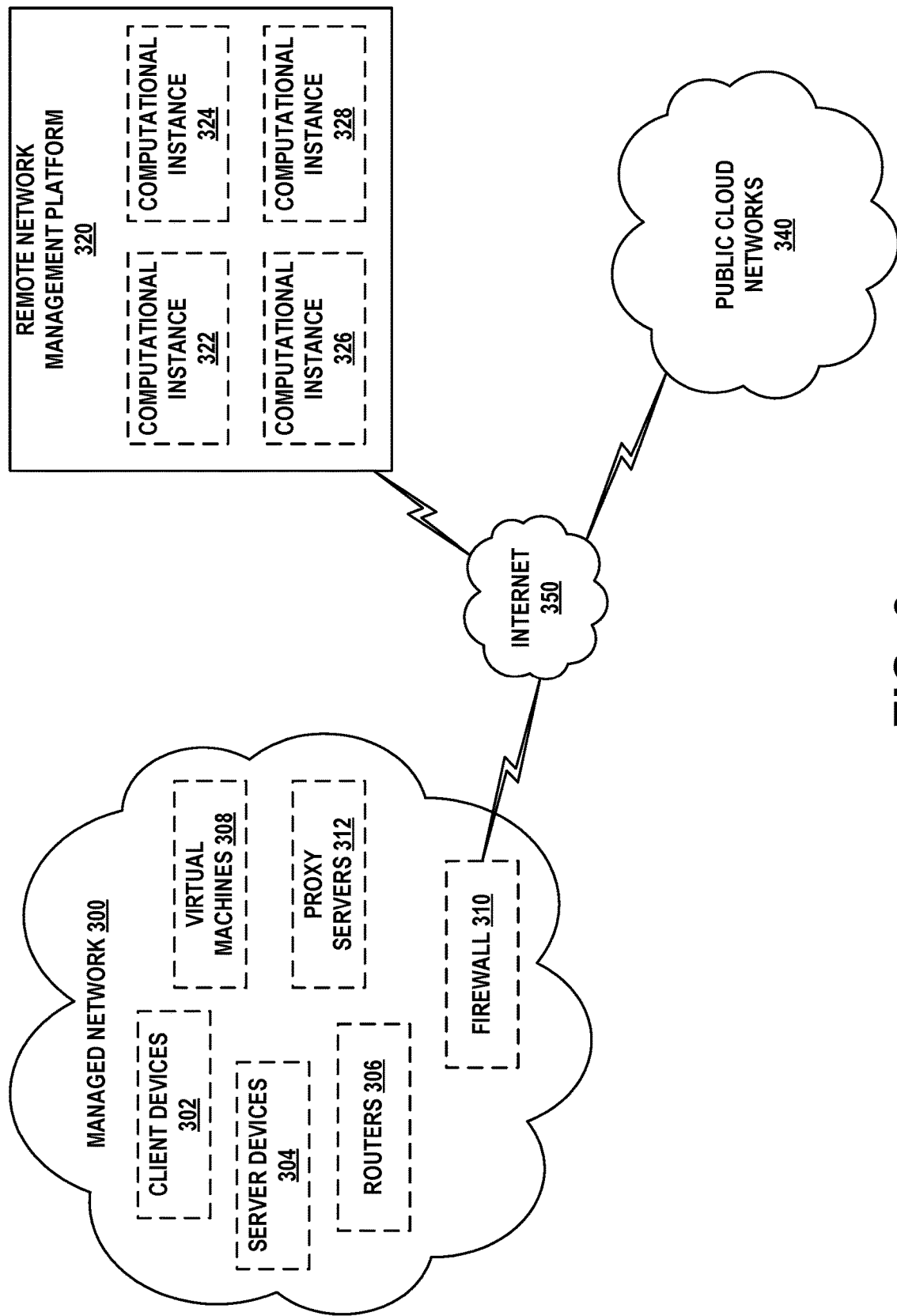
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
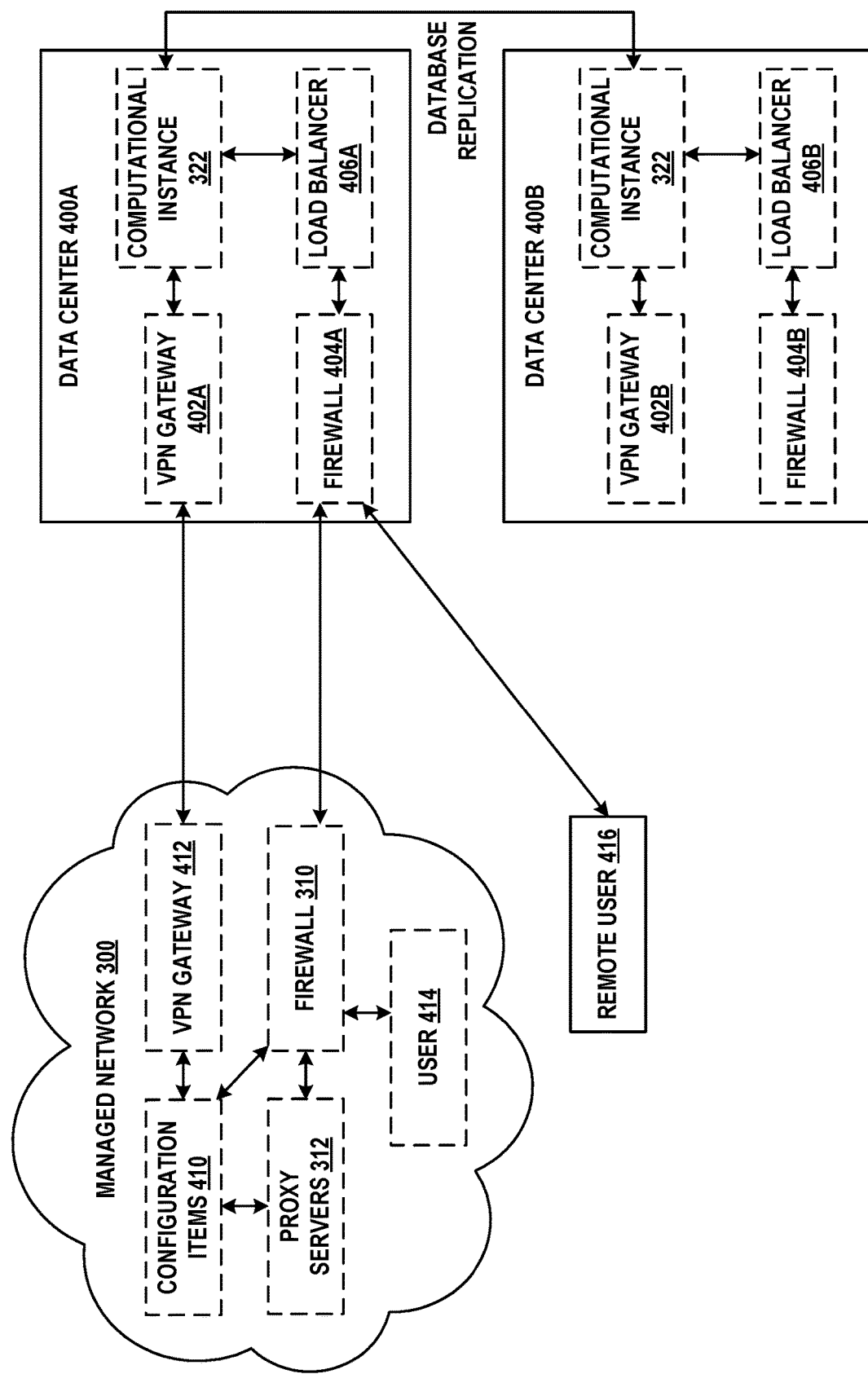
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
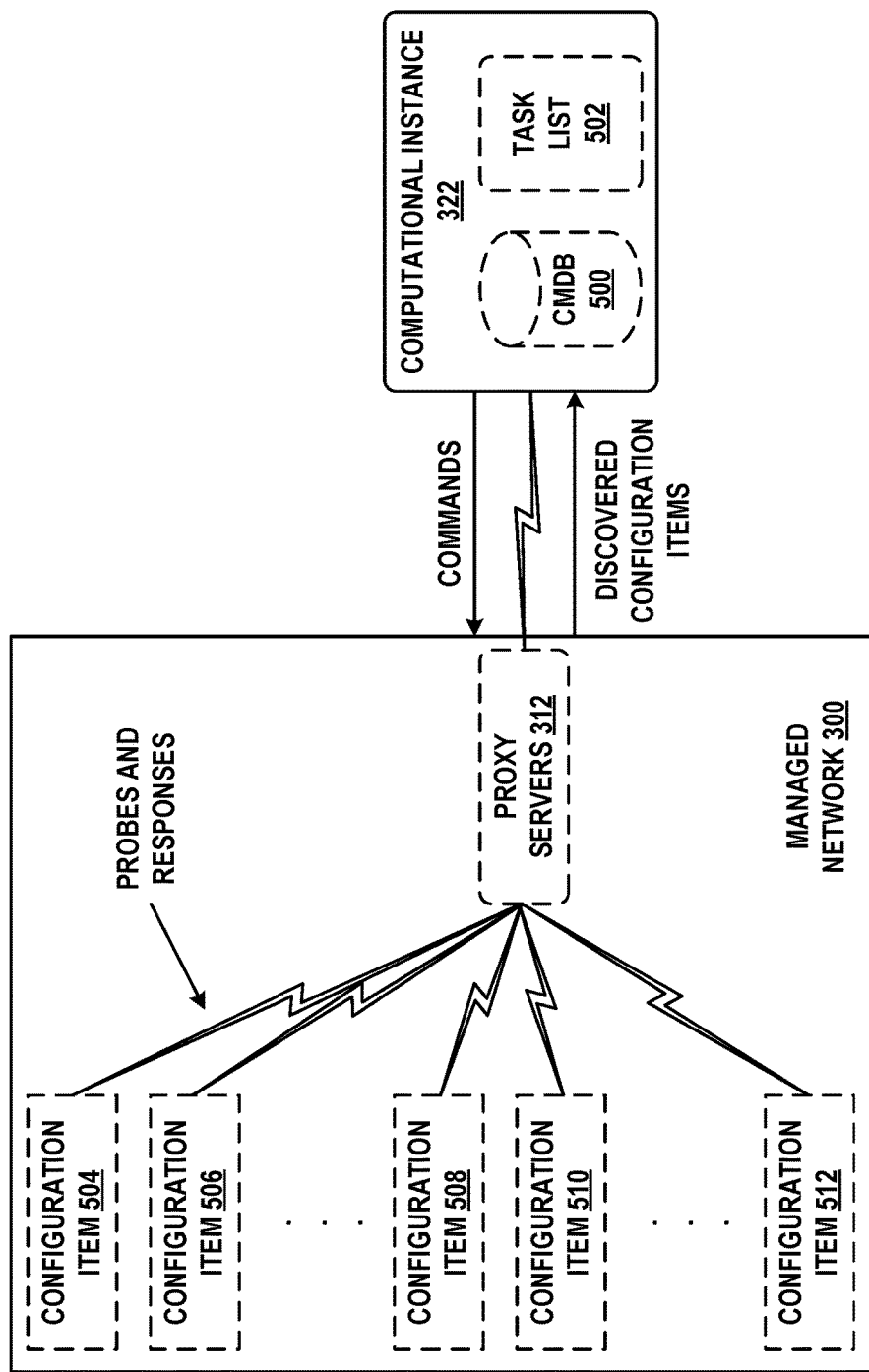
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
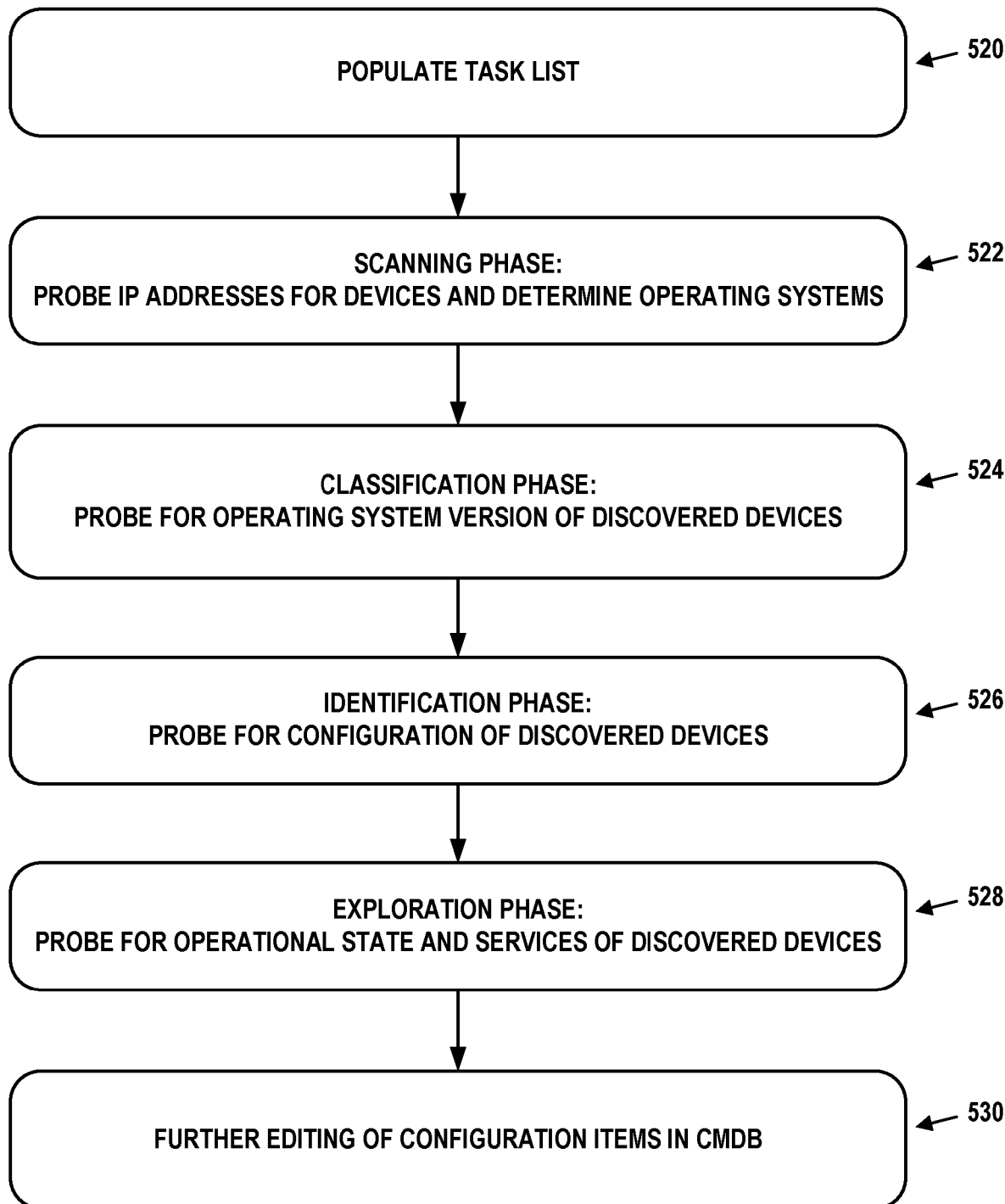
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Robotic Process Automation Remediation

Robotic process automation (RPA) is a general term for the deployment and use of software "bots" that automate human-computer interaction and computer-computer interaction. These bots may take the form of any type of software, such as a compiled program, interpreted script, client-server application, and so on. Thus, bots may be referred to as software bots, software programs, or applications, for example.

The tasks that bots carry out may be simple, complex, or anywhere in between. Example tasks are candidates for RPA include data entry, scanning documents for keywords or phrases, sorting data into categories, moving files from one location to another, obtaining information from or writing information to a server or database, generating analytics, troubleshooting, synchronizing data, collecting data from multiple remote sources, and so on. It is possible for bot to perform a wide variety of additional tasks as well across many functions, such as IT, HR, finance, engineering, customer service, just to name a few.

One of the advantages of RPA comes from the ability to automate many of the routine, error-prone, frequent, and manual tasks that humans typically perform. This saves time and resources, allowing enterprises to focus on more strategic efforts to propel high-level and/or complex initiatives forward. Nonetheless, bots in real-world scenarios often fail because the computing systems and network on which they operate are dynamic in nature. Thus, the data, servers, services, interfaces, and other objects on which the bots rely may not be present where the bots are programmed to look, or may not exist at all. This means that the efficacy of a bot depends not only on the bot's programming but also the environment in which it operates. In some cases, bot failures may remain undetected for hours, days, or weeks, leaving important tasks not performed.

As a result, while bots may offload some tasks that would otherwise be performed by human agents, additional human agents may be required to debug, correct, and otherwise manage the bots. Without improvement to how bots operate and are managed, the gains expected from bot deployment will be limited.

The embodiments herein address these and other technical problems with an architecture and techniques for remediation of bot failure. Such an architecture can be deployed within a computing system or network to monitor the operation of bots, predict when particular bots have failed are likely to fail, and then take proactive measures to address these failures in a rapid fashion that is automated or semi-automated.

It has been observed that a large portion, perhaps 50% or more, of bot failures have a fairly limited number of root causes, such as improper authentication credentials (e.g., wrong userid/password), an inability to access another device (e.g., a server is down or its address has changed), or data expected to be in a particular location cannot be found. Thus, addressing even just a few of these scenarios can potentially resolve the majority of real-world bot failures.

A. Remediation Architecture

Figure 6:
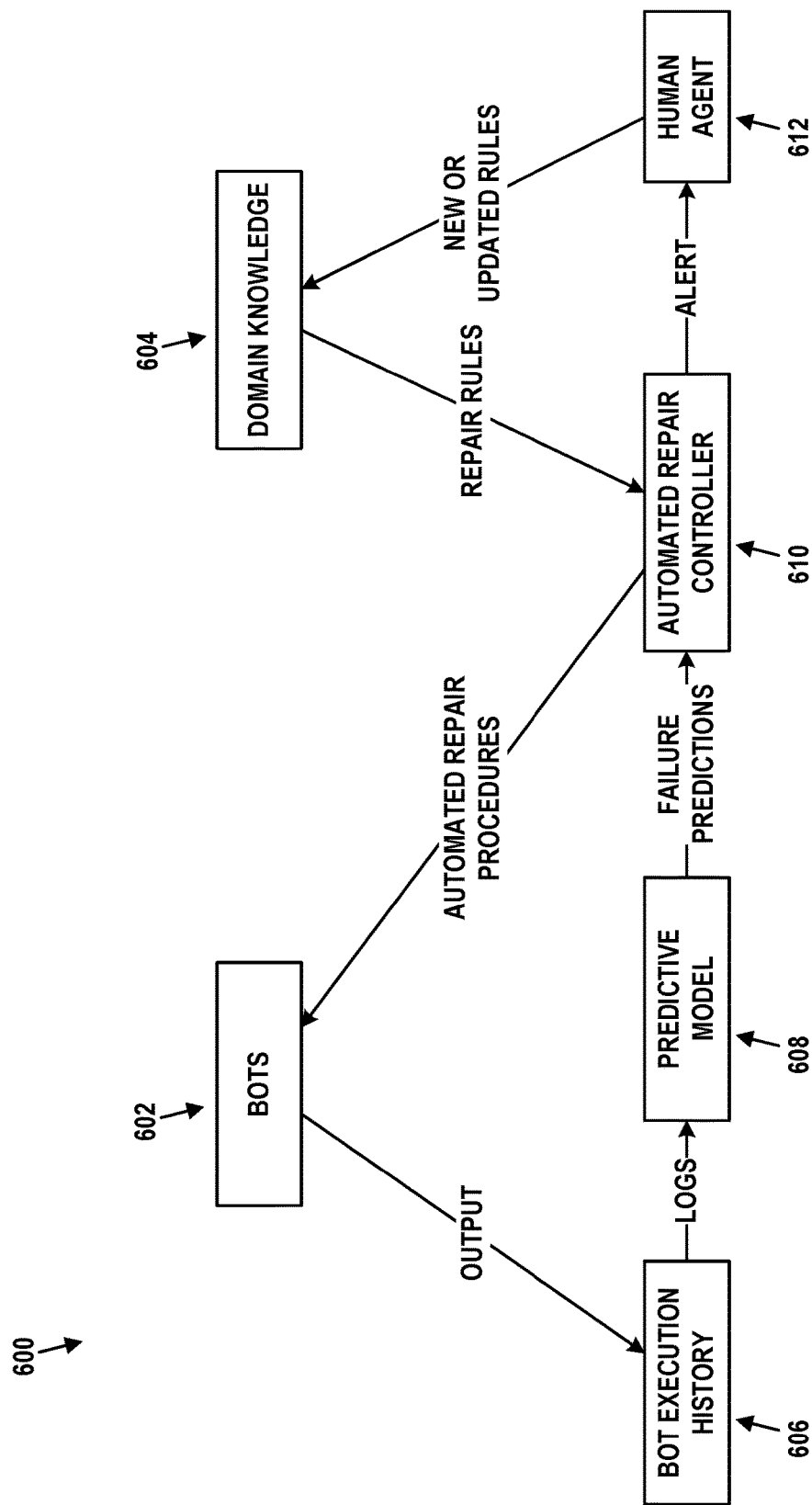
FIG. 6 depicts a remediation architecture, in accordance with example embodiments.

FIG. 6 depicts an example remediation architecture 600. The software components, data, and associated processing may take place on one or more computing devices within a managed network and/or a remote network management platform, for example.

Bots 602 represent one or more bots as described above, configured to carry out tasks on a computing system or network. Bots 602 may write output to bot execution history 606, which could take the form of log files, entries in a database, or be arranged in some other manner. An example of bot execution history 606 in log form is shown in FIG. 7 and will be discussed in more detail below.

Bot execution history 606 may provide logs to predictive model 608. These logs refer to any form of data that represents the output or execution of bots 602. Thus, the logs may be a subset or processed version of the output received by bot execution history 606.

Predictive model 608 may be a machine-learning, rules-based, or other form of model that predicts whether the data in the logs represents bot failures. In the embodiments herein, supervised or unsupervised machine learning models are assumed, but other techniques may be used to generate predictions. Predictive model 608 may also be referred to as a bot manager, in the sense that it can monitor and/or supervise the execution of bots.

Regardless of type, predictive model 608 analyzes the logs and provides failure predictions to automated repair controller 610. Such a failure prediction may identify the bot, the instance of execution of the bot that has experienced the predicted failure, a timestamp of the time of the failure, and/or a failure category, such as "authentication failed", "file not found", "server not responding" and so on. These failure predictions may include estimates of the root causes for each determined failure.

Automated repair controller 610 applies domain knowledge 604 to the failure predictions. If any automated repair procedures are determined to be applicable, they are carried out. While the automated repair procedures are represented as an arrow from automated repair controller 610 to bots 602, such direct communication between these components need not happen. While automated repair controller 610 could provide information to, reconfigure, and/or trigger the restart of one or more of bots 604, automated repair controller 610 could alternatively or additionally reconfigure, change, or restart one or more software programs or hardware devices on the managed network. Further, automated repair controller 610 may look up and/or obtain data from a CMDB (such as CMDB 500) in order to determine or carry out the automated repair procedures.

In some embodiments, automated repair procedures may take the form of one or more software programs or scripts that may operate on one or more computing devices of the managed network. For instance, automated repair controller 610 may cause, by way of a proxy server (e.g., proxy server 312) for example, remote triggering the execution of a script that reconfigures one or bots 602.

In the case that automated repair controller 610 cannot determine an automated repair procedure for a particular failure (e.g., no such procedure is provided by domain knowledge 604), automated repair controller 610 may alert human agent 612. This alert may take the form of an email, phone call, text message, or push notification. Alternatively or additionally, the alert involve automated repair controller 610 opening an incident report in an incident tracking system, and the incident report being assigned to human agent 612.

Human agent 612 may be an administrator who has some degree of control over the bots, the computing devices upon which they execute, and any other computing devices accessed, relied on, or impacted by the bots. The alert may contain a representation of at least a relevant portion of the logs. From this information, human agent 612 may be able to repair the bot and/or its operational environment.

In some embodiments, bots 602 may execute on a managed network (e.g., managed network 300) and write bot execution history to a filesystem or database on the managed network. Automated repair procedures may cause operations to occur on the managed network. The remaining operations may take place on a computational instance (e.g., computational instance 322) of a remote network management platform (e.g., remote network management platform 320). Thus, predictive model 608, automated repair controller 610, and domain knowledge 604 may exist on the computational instance. The computational instance may obtain the logs by way of the discovery procedures described above, or the managed network may push the logs to the computational instance, such as by way of the secure file transfer protocol. Human agent 612 may be an administrator of the managed network with access to the computational instance (e.g., by way of a web-based interface).

B. Predictive Analysis of Bot Execution History

FIG. 7 provides an example log file 700. This log file may represent the output generated by one or more of bots 602 (e.g., bot execution history 606) and/or the logs provided to predictive model 608 (in some embodiments, the logs consist of a subset of the output). At least some of bots 604 may periodically or from time to time write their statuses to a log file. As just some examples, this status may indicate that a bot is attempting to do something, has succeeded in doing something, has failed in doing something, or is reporting that it is idle. Log file 700 may be dedicated to the bot, or may be a more generic log file shared by several bots or used multiple different types of applications executing on the computing system (e.g., a syslog file). Thus, the content and format of log file 700 may vary between implementations.

In log file 700, one of bots 602 (rpa_bot1) is configured to log on to a service executing on a computing device assigned the IP address 10.0.2.2 every five minutes. When doing so, rpa_bot1 may retrieve data, write data, change a setting or parameter, and/or carry out some other operation.

Each time that rpa_bot1 attempts to log on to the service, it records the outcome of this attempt in log file 700. For example, at 15:53:29 on Apr. 1, 2021, rpa_bot1 wrote the string "Thu, 1 Apr. 2021 15:53:29: rpa_bot1: auth success 10.0.2.2 ssh userid admin" to log file 700. The first part of this string, "Thu, 1 Apr. 2021 15:53:29", is a time stamp indicating when the result of the attempt was known to rpa_bot1. After a colon delimiter, the next part of the string, "rpa_bot1", indicates the name of the bot. After another colon delimiter, the final part of the string, "auth success 10.0.2.2 ssh userid admin", indicates that rpa_bot1 was able to successfully log on and authenticate itself to the service at 10.0.2.2 using SSH. Thus, this string represents an instance of an authentication success.

In contrast, at 16:18:29 on Apr. 1, 2021, rpa_bot1 wrote the string "Thu, 1 Apr. 2021 16:18:29: rpa_bot1: auth failure 10.0.2.2 ssh userid admin" to log file 700. Notably, the final part of the string, "auth failure 10.0.2.2 ssh userid admin", indicates that rpa_bot1 was unable to successfully log on and authenticate itself to the service at 10.0.2.2 using SSH. Thus, this string represents an instance of an authentication failure. For example, the userid/password pair provided by rpa_bot1 as authentication credentials may have been incorrect.

Other types of failures could be represented in log file 700. For example, at 16:23:29 on Apr. 2, 2021, rpa_bot1 wrote the string "Thu, 2 Apr. 2021 16:23:29: rpa_bot1: error—server unreachable 10.0.2.2" to log file 700. This string indicates that rpa_bot1 was unable to access 10.0.2.2 at all. For example, attempts to log on to the service at 10.0.2.2 may have timed out. This may have resulted from the IP address 10.0.2.2 being unreachable, perhaps because the service was moved to a different IP address.

Regardless, the text in log file 700 may be used by predictive model 608 to classify each event. For example, predictive model 608 may be a trained machine learning model that can differentiate between strings in log file 700 that represent failures from those that represent successes. In other words, predictive model 608 could classify strings containing the words "error" or "failure" as an indication of a failure, and also classify strings containing the words "success" as an indication of success. These indications may be represented as numbers, textually, or in a different manner. In other words, predictive model 608 may be able to segment the data in log file 700 into successes and failures, and then further classify the failures into types.

Thus, the types of error or the types of success may be reflected in the classification. For instance, the failures in log file 700 that occurred on Apr. 1, 2021 may be classified as authentication failures, and the failures in log file 700 that occurred on Apr. 2, 2021 may be classified as reachability failures. Other possibilities exist.

As such, predictive model 608 may operate in a supervised or unsupervised fashion. If predictive model 608 operates in a supervised fashion, then it may be trained with a large number of log file entries that are manually labelled with their type of success or failure. In this way, predictive model 608 is able to learn patterns in log file entries that are indicative of particular types of success or failure (e.g., one or more tokens or substrings of these entries). If predictive model 608 operates in an unsupervised fashion, then it may cluster log file entries based on the content therein. This clustering may project these entries into an n-dimensional space based on some form of word vector, paragraph vector, term frequency/inverse document frequency (TF/IDF), syntactic analysis, semantic analysis, or other techniques. Hybrid pre-trained models, such as Bidirectional Encoder Representations from Transformers (BERT) could also be used.

Nonetheless, other non-learning classification models could be used. For example, a rules-based model may classify log file entries based on keywords or keyphrases therein. Thus, the classification may be based on the presence or absence of certain strings in each entry.

Further, in some embodiments, provided classifications may be each associated with a degree of confidence, such as a confidence value or confidence interval. A confidence value may indicate the model's calculated likelihood that the classification is correct (e.g., 70% or 95%). A confidence interval may be a range of such values (e.g., 65%-75% or 93%-97%). These degrees of confidence indicate a signal strength for prediction. As such, they may be logged or stored by the model with a representation of the associated log file content so that a human user can later determine why the model made a particular prediction.

C. Automated Repair

As shown in FIG. 6, once entries of a log file, such as log file 700, are classified by predictive model 608, classifications representing failure predictions may be provided to automated repair controller 610. These failure predictions may take the form of an integer, a string, or some other type of representation. For example, and continuing with the content of FIG. 7, a value of "1" may represent an authentication failure, a value of "2" may represent a reachability failure, and so on. In many practical scenarios, other information regarding such failures may be provided with a failure prediction, such as the name of the bot, the computing device on which the bot is executing, the computing device that the bot tried to access, and so on.

Automated repair controller 610 may incorporate aspects of domain knowledge 604 when determining how to address bot failures. To that point, domain knowledge 604 may include or refer to instructions (e.g., in the form of software programs and/or scripts) that may be able to repair bots and/or the environments in which they operate so that further bot operations are more likely to succeed.

FIG. 8 provides an example of domain knowledge 604 in the form of table 800. In this table, each entry contains an indication of failure type, a description of the failure, a name of the bot subject to the failure, an IP address of a correspondent node with which the bot was attempting to communicate, and a reference to a repair script. In some embodiments, more or fewer fields may be present. Also, some fields may take on various forms. For example, the correspondent node address could be something other than IP address (e.g., a domain name), and the repair script field could be a URL, directory path, and/or file name of a repair script.

Automated repair controller 610 may search or iterate through domain knowledge 604 and apply one or more rules that match a failure prediction. This matching may involve text or parameters of the failure predicting matching one or more fields of a record in domain knowledge 604.

To this point, in table 800, record 802 is a rule that indicates a failure type of "1" and a description of "auth failure". Thus, the failure type is that of a bot that failed authentication. The bot name is "rpa_bot1" and the correspondent node address is 10.0.2.2 (consistent with log file 700). Thus, a matching failure prediction will contain the text of or references to the failure type, bot name, and/or correspondent node address. Applying this rule to a matching failure prediction, may result in automated repair controller 610 causing execution of a script to refresh the credentials of "rpa_bot1". For example, current credentials may be centralized in a credential store within the managed network or computational instance, and these may be provided to the bot.

Record 804 is a rule that indicates a failure type of "2" and a description of "server unreachable". Thus, the failure type is that of a bot that was unable to communicate with a server. The bot name is "rpa_bot1" and the correspondent node address is 10.0.2.2 (again consistent with log file 700). Thus, a matching failure prediction will contain the text of or references to the failure type, bot name, and/or correspondent node address. Applying this rule to a matching failure prediction, may result in automated repair controller 610 causing execution of a script to restart "rpa_bot1", restart the server at 10.0.2.2, or cause "rpa_bot1" to attempt the transaction with another correspondent node address. For example, the service that "rpa_bot1" is attempting to access may have moved to a different IP address, and this IP address may be provided to the bot.

The examples in FIGS. 7 and 8 are merely illustrative and other types of failures may be addressed by the embodiments herein. For instance, failures due to high memory or processor utilization (e.g., greater than about 90%) may be addressed by scheduling later execution of the bot and alerting a human agent. Likewise, failures due to a version mismatch between two units of software may be addressed by rolling back or upgrading the version of one of the units of software. Other possibilities exist.

In some embodiments, a "cold start" scenario can be supported. This type of scenarios is particularly useful when a bot is being executed for the first time overall, or the first time after a modification to the bot or the environment in which it executes (e.g., the managed network). To that end, before the bot is scheduled for operation, it can be tested with a null transaction. The null transaction would test the connectivity of the bot, and the liveness of the correspondent nodes (e.g., applications or services on other devices) with which it communicates. The bot and/or its correspondent nodes may need to explicitly support such an operation. If the null transaction succeeds, then the bot is scheduled for operation. If the null transaction fails, an alert is provided to a human agent and the logs produced by the bot or its correspondent nodes can be used to train predictive model 608.

D. Example Prediction and Repair Transaction

Figure 9:
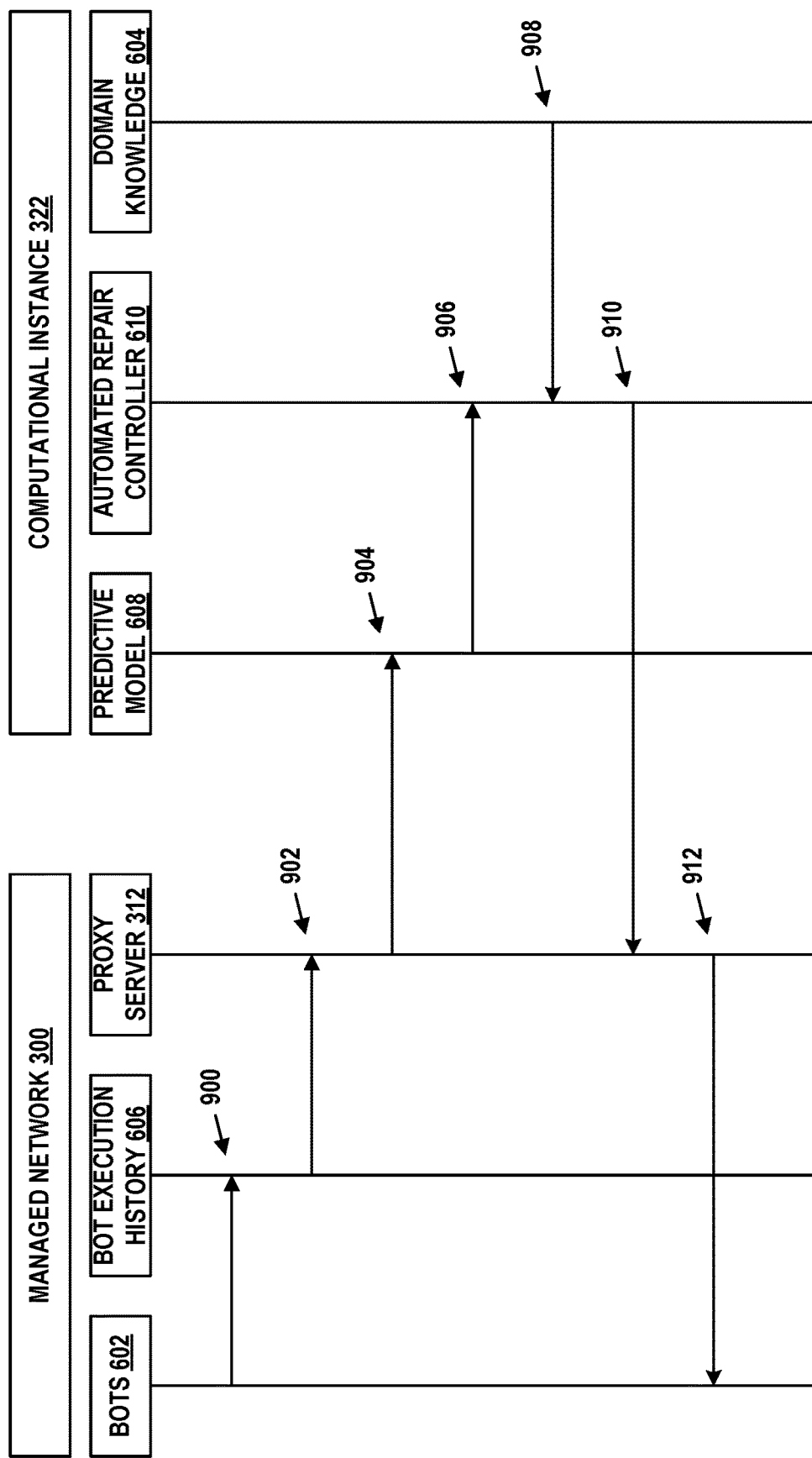
FIG. 9 is a message flow diagram, in accordance with example embodiments.

FIG. 9 depicts a prediction and repair transaction in accordance with example embodiments. This transaction is just one possibility, and other embodiments may exist. In FIG. 9, bots 602, bot execution history 606, and proxy server 312 are disposed within managed network 300, while predictive model 608, automated repair controller 610, and domain knowledge 604 are disposed within computational instance 322. But in some embodiments, these components may be distributed in a different fashion. For example, all of the components may be disposed in within managed network 300 or within computational instance 322.

At step 900, bots 602 write their statuses to bot execution history 606, perhaps in the form of a log file. At step 902, a representation (e.g., subset) of this status is provided to proxy server 312 (for example, proxy server 312 may retrieve the representation from bot execution history 606 based on a request from computational instance 322 or automatically). At step 904, proxy server 312 may provide the representation to predictive model 608 (e.g., based on a request from computational instance 322 or automatically).

At step 906, predictive model 608 may provide failure predictions to automated repair controller 610. These failure predictions may be based on processing of the representations by a machine learning model, for example. At step 908, automated repair controller 610 may retrieve repair procedures from domain knowledge 604. In some embodiments, step 908 may take place in response to step 906 or automatically at an earlier time. At step 910, automated repair controller 610 may transmit repair procedures (directly or indirectly) to proxy server 312. At step 912, proxy server 312 may cause the repair procedures to be carried out. This could involve restarting or reconfiguring bots 602, restarting or reconfiguring other software programs or computing devices of managed network 300, and/or some other activities.

E. Example Operations

Figure 10:
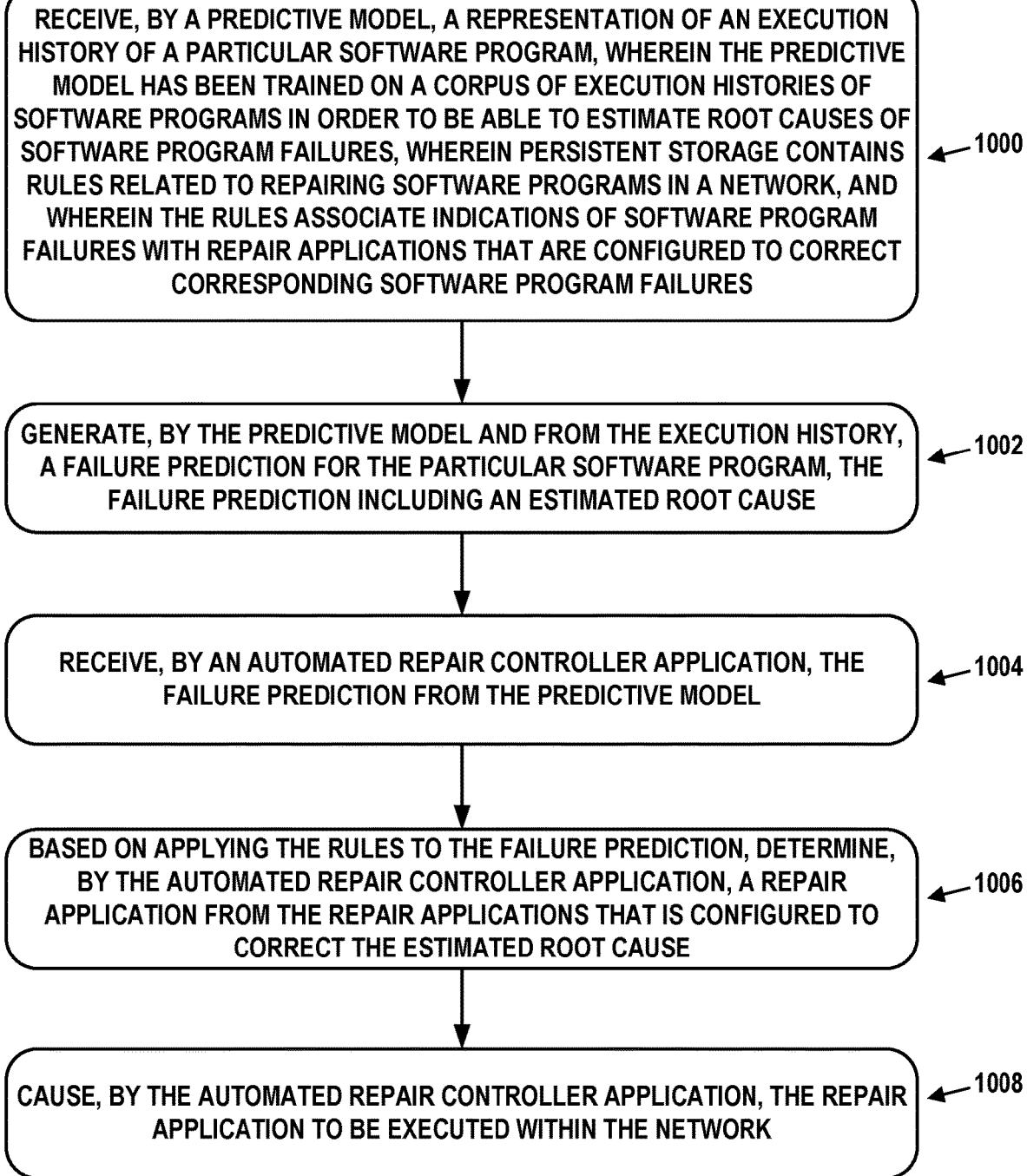
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the other figures or otherwise described herein.

Block 1000 may involve receiving, by a predictive model, a representation of an execution history of a particular software program (bot), wherein the predictive model has been trained on a corpus of execution histories of software programs in order to be able to estimate root causes of software program failures, wherein persistent storage contains rules related to repairing software programs in a network, and wherein the rules associate indications of software program failures with repair applications that are configured to correct corresponding software program failures.

Block 1002 may involve generating, by the predictive model and from the execution history, a failure prediction for the particular software program, the failure prediction including an estimated root cause.

Block 1004 may involve receiving, by an automated repair controller application, the failure prediction from the predictive model.

Block 1006 may involve, possibly based on applying the rules to the failure prediction, determining, by the automated repair controller application, a repair application from the repair applications that is configured to correct the estimated root cause.

Block 1008 may involve causing, by the automated repair controller application, the repair application to be executed within the network.

Some embodiments may further involve receiving, by the predictive model, a second representation of a second execution history of a second particular software program of the software programs; generating, by the predictive model and from the second execution history, a second failure prediction for the second particular software program, the second failure prediction including a second estimated root cause; receiving, by the automated repair controller application, the second failure prediction from the predictive model; possibly based on applying the rules to the second failure prediction, determine, by the automated repair controller application, that the rules do not specify a matching repair application; and causing, by the automated repair controller application, an alert regarding the second failure prediction to be transmitted to a human agent.

Some embodiments may further involve, possibly after causing the alert to be transmitted to the human agent, receiving, from the human agent, an update to the rules that specifies the matching repair application for the second failure prediction.

In some embodiments, the rules each include: (i) a repair application reference, and (ii) one or more of a software program name, a software program failure indication, or a network address.

In some embodiments, the failure prediction includes at least one of the software program name, the software program failure indication, or the network address.

In some embodiments, determining the repair application that is configured to correct the estimated root cause comprises selecting a particular rule from the rules, wherein the particular rule matches one or more of the software program name, the software program failure indication, or the network address included in the failure prediction, and wherein the particular rule contains a particular repair application reference to the repair application.

In some embodiments, the network address is of a computing device on which the particular software program executes or with which the particular software program attempts to communicate.

In some embodiments, the estimated root cause is one or more of: missing authentication credentials, or a server or application being unreachable or unresponsive.

In some embodiments, execution of the repair application causes the particular software program to be restarted or reconfigured.

In some embodiments, execution of the repair application causes an application, device, or service used by the particular software program to be restarted or reconfigured.

In some embodiments, the execution history of the particular software program includes at least part of a log file generated by the particular software program.

In some embodiments, the predictive model was either trained on the corpus of execution histories using unsupervised machine learning, or trained on labelled entries of the corpus of execution histories using supervised machine learning.

In some embodiments, the predictive model and the automated repair controller application are disposed within a computational instance of a remote network management platform that is configured to manage the network, and wherein receiving the representation of the execution history and causing the repair application to be executed within the network occur by way of a proxy server disposed within the network.

VII. Incorporation of Bots into CMDB Records

As noted above, a CMDB, such as CMDB 500, may contain a set of database tables defining physical and virtual computing hardware, components, software, services, and other items deployed in a managed network, as well as relationships therebetween. The content of the CMDB is intended to represent the "ground truth" about these items, and may be regularly updated by discovery procedures and/or manually.

Given the importance of bots to numerous applications and services that involve a managed network, it may be beneficial to integrate representations of bots into the CMDB as configuration items. This would allow associations to be made between: (i) a bot and the physical or virtual device on which it executes, and/or (ii) the bot and correspondent nodes in the managed network with which the bot interacts.

When a bot fails, one of the most difficult problems is determining whether the root cause of the failure is due to an error in the bot itself, its configuration, or one or more of the correspondent nodes. By tracking relationships between the bots and other configuration items, the root cause analysis can be focused, resulting in faster and more accurate debugging and resolution procedures. Further, the existence of these relationships in the CMDB can be leveraged to provide automatic notifications to human agents when the system may need attention, either on a proactive or reactive basis.

Current solutions merely involve the execution of bots, and are lacking the level of integration and intelligent handling of bots described herein. For example, human agents making changes to a managed network may not be aware that bots are automating mission-critical processes in the network and may be impacted by the changes. This lack of visibility means that these processes are more likely to fail due to planned or unplanned system maintenance.

The embodiments herein address these and other problems by making relationships between bots and what they rely on and/or impact explicit. As a consequence, the uptime and relatability of services provided by or to the managed network can be improved.

A. Example Database Schema

Figure 11:
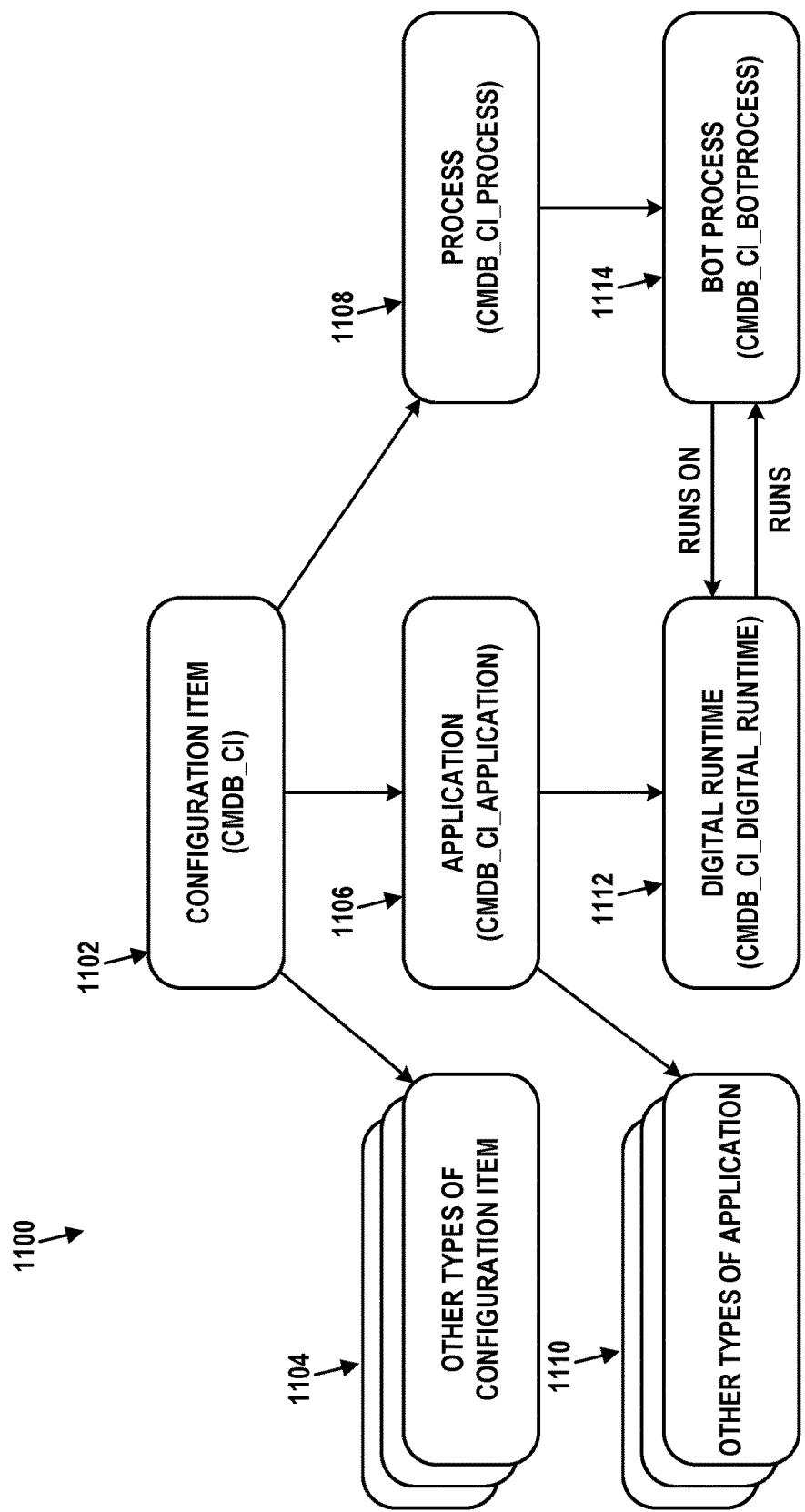
FIG. 11 depicts a partial database schema, in accordance with example embodiments.

FIG. 11 provides an example database schema 1100 in accordance with possible embodiments. The tables defined by such a schema would contain representations of digital and physical assets and services associated with a managed network. To that point, FIG. 11 provides just a portion of a full database schema that would reside in a CMDB. In alternative embodiments, the tables and columns (attributes) of database schema 1100 may have different names, store different values, and have more or less information that what is presented herein.

Each item in database schema 1100 defines a database table and its relationships with other database tables in the schema. The core table is configuration item (cmdb_ci) table 1102, which is arranged to store general configuration items. Columns of table 1102 may include definitions of a category, class, description, DNS domain, IP address, MAC address, name, operational status, owner (human agent or group in charge of the configuration item), serial number, and sysid (unique identifier) of the configuration item, if applicable.

Other tables may be defined as child tables that inherit the columns of table 1102, while adding new columns of their own. Thus, table 1102 may serve as the root of a hierarchy of tables that define configuration items for hardware devices, software that operates on these devices, and so on. For example, and simplified for purposes of illustration, application (cmdb_ci application) table 1106, process (cmdb_ci_process) table 1108, and other types of configuration item table 1104 may inherit from table 1102.

Table 1106 may define applications, which can be specified as a collection of files (some executable, some perhaps not executable) that contribute to or deliver a service. Types of applications may include database applications, web applications, productivity applications, and so on. Table 1108 may define processes that are carried out by one or more applications and/or as part of a service. For example, processes may include onboarding of new employees, resetting of passwords, upgrading or rollback of software patches, and so on.

Like table 1102, other tables may be defined as child tables that inherit the columns of table 1106, while adding new columns of their own. Thus, table 1106 may serve as the root of a hierarchy of tables that define configuration items for various specific applications. For example, and simplified for purposes of illustration, digital runtime (cmdb_ci_digital_runtime) table 1112, and other types of application tables 1110 may inherit from table 1106. Table 1112, in turn, may define execution environments (e.g., a JAVA® virtual machine) on which a bot can be executed.

Also like table 1102, other tables may be defined as child tables that inherit the columns of table 1108, while adding new columns of their own. Thus, table 1108 may serve as the root of a hierarchy of tables that define configuration items for various specific processes. For example, and simplified for purposes of illustration, bot process (cmdb_ci_botprocess) table 1114 may inherit from table 1108. Table 1114, in turn, may define bots that carry out processes.

Also not shown in FIG. 11 for purposes of simplicity, is a relationship table. Each entry in such a table may reference two configuration items defined in the hierarchy of configuration item tables, as well as a type of relationship between these items. Example relationships include "is hosted on", "runs on", "runs", "depends on", "used by", and so on.

Example relationships are shown between table 1112 and table 1114. These relationships indicate that bots defined in table 1114 run on execution environments defined in table 1112, and execution environments defined in table 1112 run (execute) bots defined in table 1114. For example, an execution environment may receive instructions from a computational instance containing information about a bot to execute as well as parameters to provide to the bot. Bots both may execute in such execution environments and then provide results of the execution to the computational instance.

Further relationships can be made between bots, their execution environments and various IT service management databases, such as incident databases, problem databases, knowledge databases, change request databases, as so on. These relationships may be made by referring to the sysids of the bots and/or their execution environments.

B. Visualizing Relationships

One of the advantages of representing a bot as a configuration item and defining its relationships with other configuration items is the ability to rapidly determine these relationships. For example, various graphical user interface or command line tools may allow a human agent to specify a configuration item in a search interface, and search for bots that interact with or rely on that configuration item to some extent. Likewise, a human agent may specify a bot configuration item in a search interface and search for other configuration items that the bot interacts with or relies on to some extent. Alternatively, these relationships may be automatically searched and determined when a configuration item (bot or otherwise) is viewed. In this manner, the human agent is able to determine the bots that might be impacted by a change to a configuration item, as well as the configuration items that could impact bot behavior, if applicable.

Figure 12A:
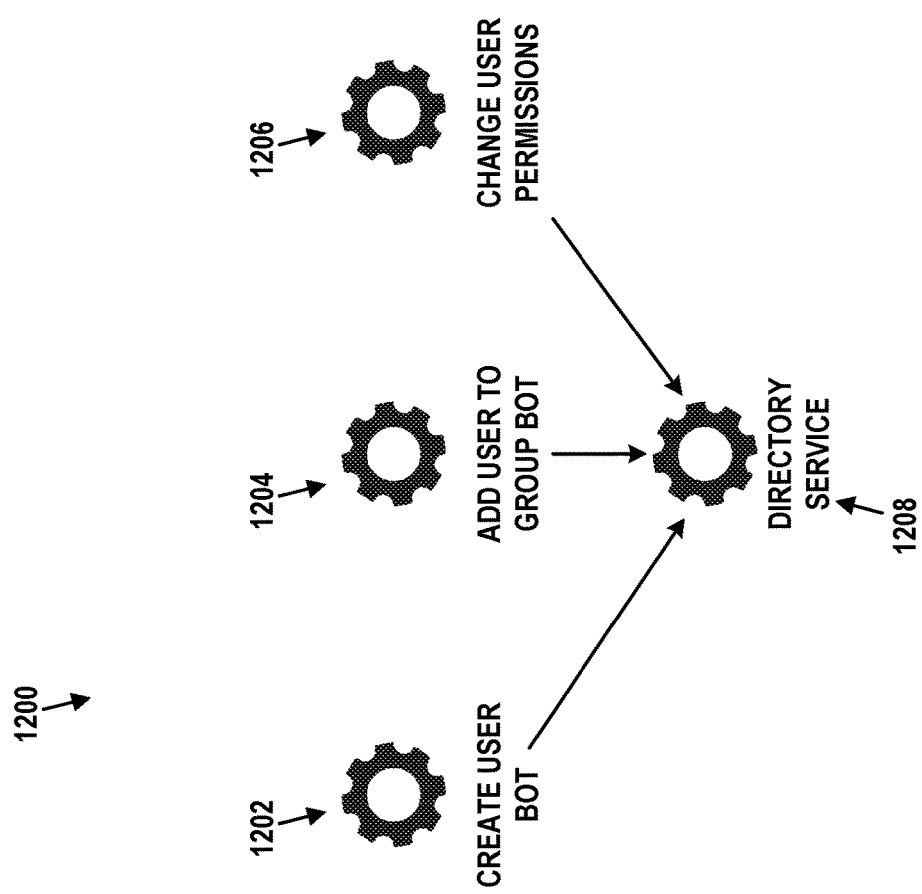
FIG. 12A depicts a visualization of configuration item relationships, in accordance with example embodiments.

FIG. 12A provides an example visualization 1200. Visualization 1200 could be a graphical user interface provided by a computational instance of a remote network management platform. Visualization 1200 centers around directory service configuration item 1208. This directory service could be MICROSOFT® ACTIVE DIRECTORY®, for example, or another LDAP-based, DNS-based, or alternative service.

As shown, three bots use this service, each represented by respective configuration items. Create user bot configuration item 1202 may represent a bot that creates users in the directory service. Add user to group bot configuration item 1204 may represent a bot that associates users in the directory service with groups of such users. Change user permissions bot configuration item 1206 may represent a bot that changes the permissions of a user in the directory service.

Visualization 1200 assists a human agent who is considering making a change to the directory service, such as a software upgrade, software rollback, change of address, change of configuration, or causing the directory service to be temporarily unavailable. This individual would unambiguously be able to identify that the bots associated with configuration items 1202, 1204, and 1206 are potentially impacted. Further, this individual would be able to contact the owners of these bots to discuss the change before carrying it out. This may allow those owners to make corresponding changes to their respective bots in conjunction to the change made to the directory service. For example, if the change to the directory service is a change of its IP address or domain name, each of the bots may be updated to use the new IP address or domain name when accessing the directory service.

Figure 12B:
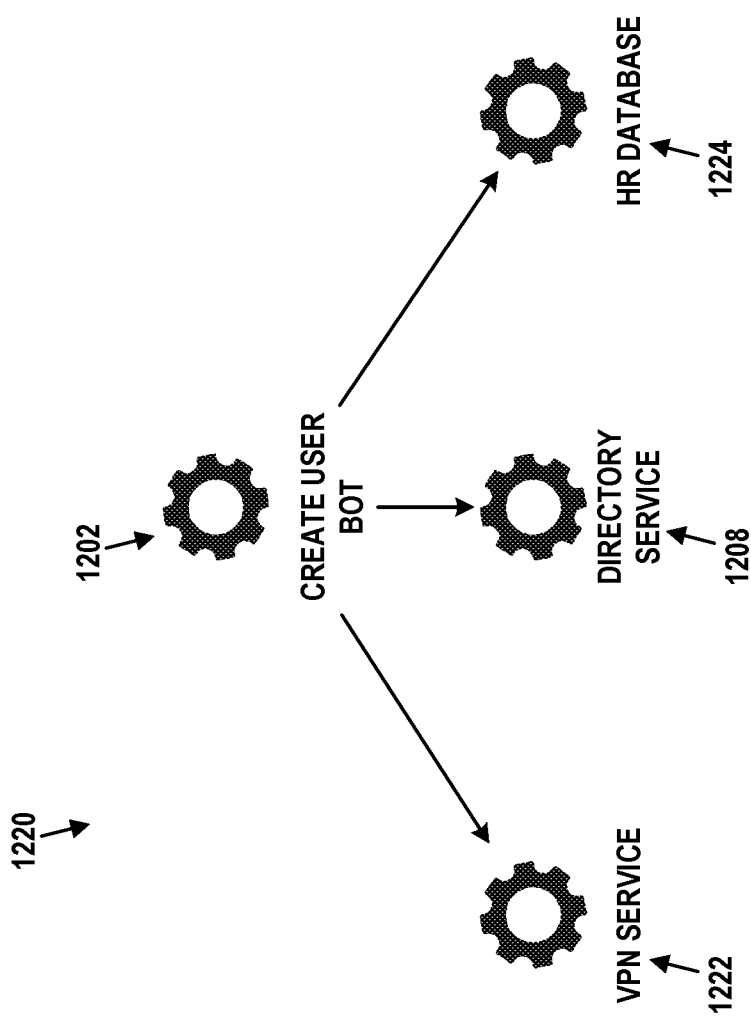
FIG. 12B depicts another visualization of configuration item relationships, in accordance with example embodiments.

FIG. 12B provides an example visualization 1220. Visualization 1220 also could be a graphical user interface provided by a computational instance of a remote network management platform. Visualization 1220 centers around create user bot configuration item 1202. In accordance with visualization 1200, the create user bot interacts with the directory service associated with directory service configuration item 1208. But this bot also interacts with a VPN service represented by VPN service configuration item 1222 and an HR database represented by HR database configuration item 1224. For example, the create user bot may be configured to add a new user to multiple systems (e.g., the directory service, the VPN service, and the HR database) when executed to onboard such a user.

Visualization 1220 assists a human agent determine the services with which the create user bot interacts. For instance, if the create user bot fails, the human agent may narrow his or her root cause analysis to considering problems with the create user bot itself, as well as the directory service, the VPN service, and the HR database. In this manner, the human agent knows which services could have possibly contributed to the failure, or at least were most likely to do so. Further, if the human agent is testing a new version of the create user bot, he or she is able to determine that this testing should include interactions between the create user bot and each of the directory service, the VPN service, and the HR database.

C. Integrating Bot Relationships into Workflows

In addition, other types of visualizations reflecting the relationships between these types of configuration items can be added to graphical user interfaces. For example, FIG. 13A depicts graphical user interface 1300 for entering and/or viewing a change request. In enterprises, change requests are processes for the addition, modification, or removal of configuration items. The details of a change request, such as the reason of the change, the priority, the risk, the type of change, and the change category are stored in a change request database.

Graphical user interface 1300 includes upper section 1302, specifying the change request, and lower section 1304, specifying related configuration items. In alternative embodiments, more or fewer sections may be present.

Upper section 1302 displays attributes of the change request, along with editable text boxes allowing the specification and/or modification of each of these attributes. For example, the number of the change request is CHG0040007, it was requested by a "system admin" entity (e.g., a system administrator), is of the "server reboot" category, and involves the configuration item "directory service". In some embodiments, the configuration item may be specified by a unique number in addition to or rather than a text string.

Further, upper section 1302 also specifies that the type of change request is "emergency", its priority is "critical", risk is "moderate" and impact is "high". Put together, these attributes indicate that the system administrator is requesting that the directory service server be rebooted with high priority (e.g., as soon as possible). As indicated by the short description attribute, the goal is to apply the latest software patches to the directory server.

The content of lower section 1304 may be pre-calculated or automatically determined on the fly when graphical user interface 1300 is generated. Regardless, it indicates that the related configuration items are the create user, add user to group, and change user bots. Thus, the human agent who is tasked with making this change is aware of the possible impact on these bots, and can notify their owners. The owners, in turn, may determine that they should test their bots against the patched server to verify that the bots are still compatible with the directory service.

Figure 13B:
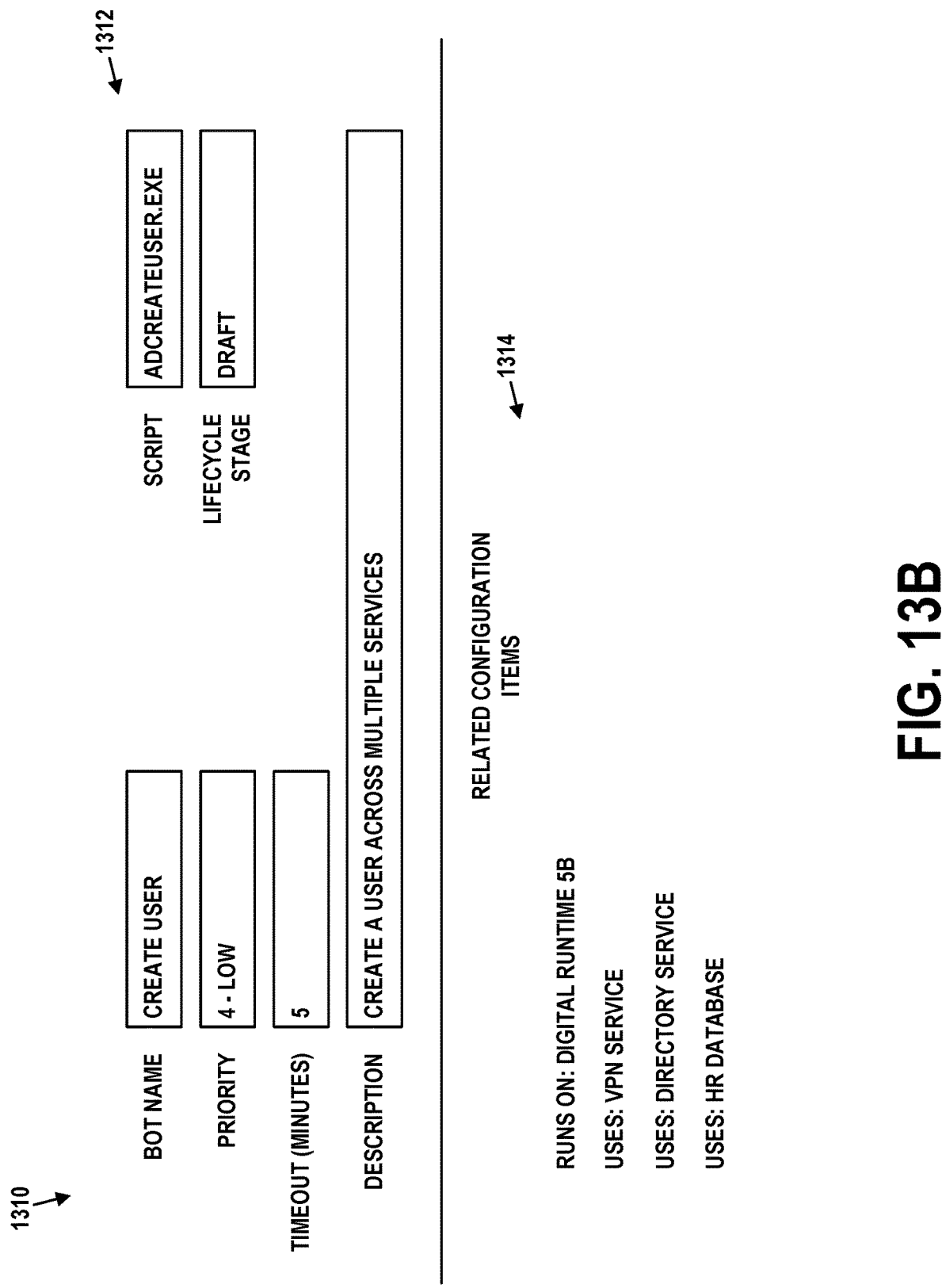
FIG. 13B depicts another graphical user interface representing configuration item relationships used in workflows, in accordance with example embodiments.

FIG. 13B depicts graphical user interface 1310 for specifying and/or viewing a bot. Graphical user interface 1310 includes upper section 1312, specifying the bot, and lower section 1314, specifying related configuration items. In alternative embodiments, more or fewer sections may be present.

Upper section 1312 displays attributes of the bot, along with editable text boxes allowing the specification and/or modification of each of these attributes. For example, the name of the bot is "create user", its priority is low, its timeout (the amount of time it waits before giving up on attempts to contact a server) is 5 minutes, it uses the executable script "adcreateuser.exe" and its current stage is "draft".

The content of lower section 1314 may be pre-calculated or automatically determined on the fly when graphical user interface 1310 is generated. Regardless, it indicates that the related configuration items are the digital runtime 5B, the VPN service, the directory service, and the HR database. Thus, the human agent who is in charge of this bot is aware of the possible impact on that these components can have on the bot.

Figure 13C:
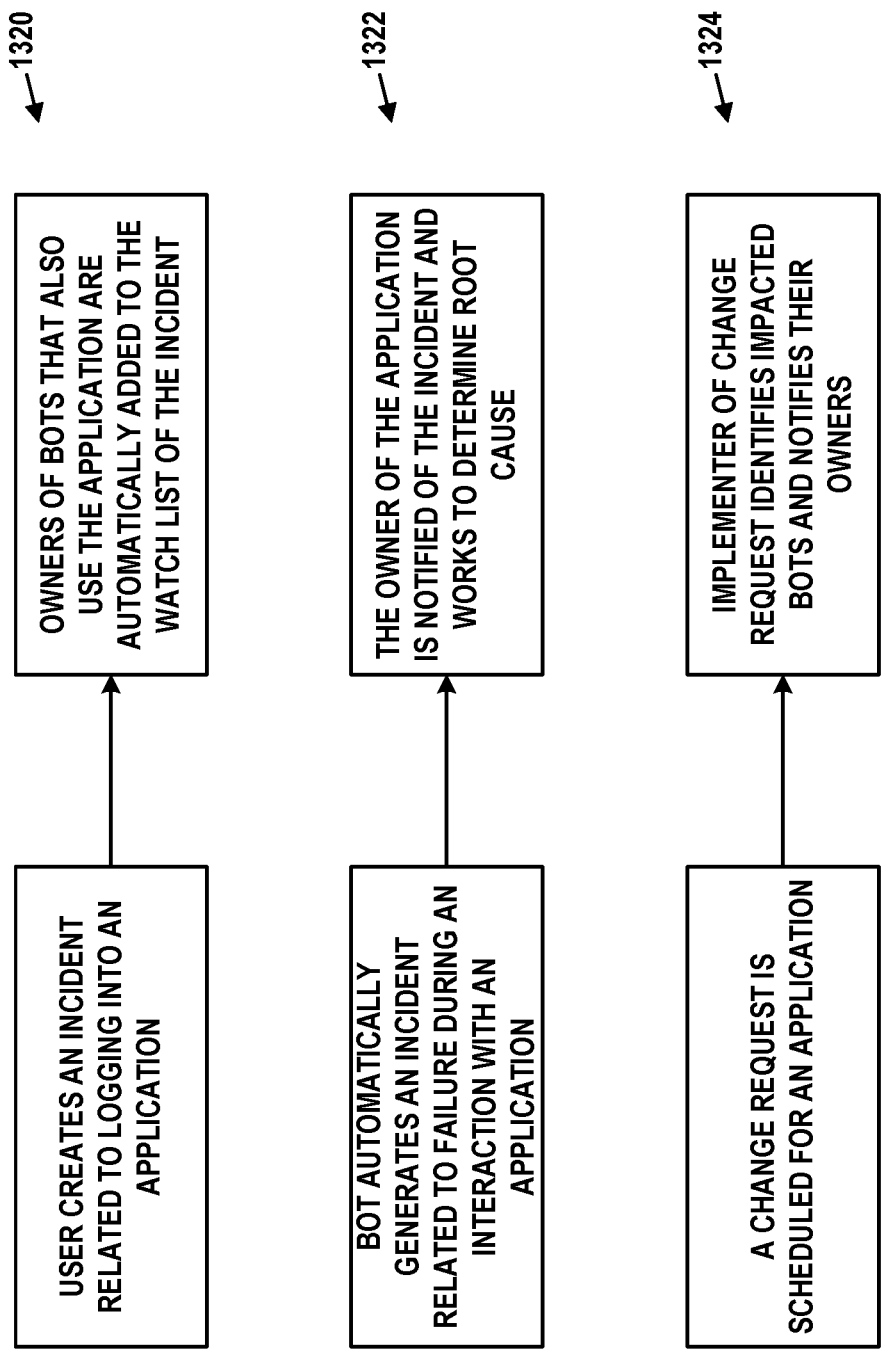
FIG. 13C depicts workflows involving bots, in accordance with example embodiments.

These embodiments facilitate a number of scenarios that improve application performance and/or avoid application down time. Some of these scenarios are illustrated in FIG. 13C.

In scenario 1320, a user creates an incident by way of an incident tracking system of a computational instance. The incident may refer to a technology-related problem that the user has experienced with the managed network—particularly, the incident may relate to difficulties that the user has experienced logging into an application hosted on the managed network or the computational instance. The computational instance may automatically search the CMDB for bots with relationships to the application. For any such relationships that are found, the owners of these bots are added to the watch list of the incident. Here, a watch list is a group of users that are notified when certain changes are made to the incident. This would allow the bot owners to be aware of the incident and quickly take appropriate measures (e.g., pausing the operation of or reconfiguring their bots).

In scenario 1322, a bot automatically generates an incident related to a failure it experienced during an interaction with an application. The failure could be an authentication failure, a reachability, failure, or some other operational failure. By way of this incident, the owner of the application is notified of the failure, and can rapidly work to determine root cause. Without this automatic incident generation, the owner might not become aware of the failure for minutes or hours.

In scenario 1324, which was discussed above, a change request for an application is created. In response, a list of one or more potentially impacted bots is provided prior to the change request being carried out. The implementer of the change request may then notify the owners of these bots. Alternatively or additionally, the creation of change request may automatically notify these owners. In this fashion, the owners can review the change request and take remedial action, if necessary, so that their bots continue to operate properly with the application.

D. Example Operations

Figure 14:
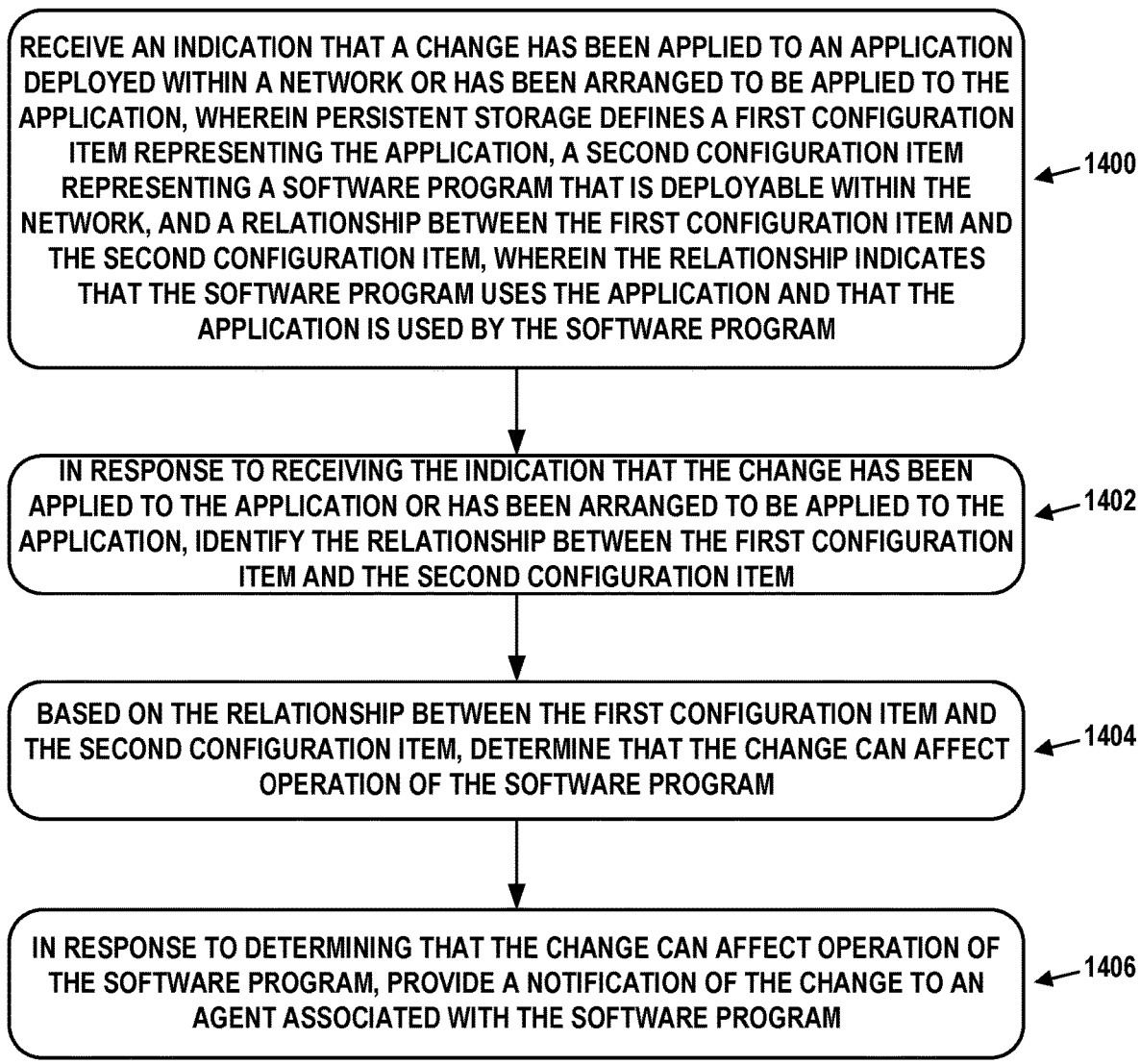
FIG. 14 is a flow chart, in accordance with example embodiments.

FIG. 14 is a flow chart illustrating an example embodiment. The process illustrated by FIG. 14 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 14 may be simplified by the removal of any one or more of the features shown therein. Further, these embodiments may be combined with features, aspects, and/or implementations of any of the other figures or otherwise described herein.

Block 1400 may involve receiving an indication that a change has been applied to an application deployed within a network or has been arranged to be applied to the application, wherein persistent storage defines a first configuration item representing the application, a second configuration item representing a software program that is deployable within the network, and a relationship between the first configuration item and the second configuration item, wherein the relationship indicates that the software program uses the application and that the application is used by the software program.

Block 1402 may involve, possibly in response to receiving the indication that the change has been applied to the application or has been arranged to be applied to the application, identifying the relationship between the first configuration item and the second configuration item.

Block 1404 may involve, based on the relationship between the first configuration item and the second configuration item, determining that the change can affect operation of the software program.

Block 1406 may involve, in response to determining that the change can affect operation of the software program, providing a notification of the change to an agent associated with the software program.

Some embodiments may involve the persistent storage also defining a third configuration item representing a second software program that is deployable within the network, and a second relationship between the first configuration item and the third configuration item, wherein the relationship indicates that the second software program uses the application and that the application is used by the second software program. These embodiments may also involve: (i) possibly in response to receiving the indication that the change has been applied to the application or has been arranged to be applied to the application, identifying the second relationship between the first configuration item and the third configuration item; (ii) possibly based on the second relationship between the first configuration item and the third configuration item, determining that the change can affect operation of the second software program; and (iii) possibly in response to determining that the change can affect operation of the second software program, providing a second notification of the change to a second agent associated with the second software program.

Some embodiments may involve the persistent storage also defining a third configuration item representing a second application deployed within the network, and a second relationship between the second configuration item and the third configuration item, wherein the second relationship indicates that the software program uses the second application and that the second application is used by the software program. These embodiments may further involve: (i) receiving a second indication that a second change has been applied to the second application or has been arranged to be applied to the second application; (ii) possibly in response to receiving the second indication that the second change has been applied to the second application or has been arranged to be applied to the second application, identifying the second relationship between the second configuration item and the third configuration item; (iii) possibly based on the second relationship between the second configuration item and the third configuration item, determining that the second change can affect operation of the software program; and (iv) possibly in response to determining that the second change can affect operation of the software program, providing a second notification of the second change to the agent associated with the software program.

Some embodiments may involve the persistent storage also defining records of incidents related to the network. These embodiments may also involve: (i) receiving a new record of an incident related to the software program experiencing a failure when attempting to use the application; and (ii) possibly based on the relationship between the first configuration item and the second configuration item, providing a second notification of the new record to a second agent associated with the application.

Some embodiments may involve the persistent storage also defining records of incidents related to the network. These embodiments may also involve: (i) receiving a new record of an incident related to a failure when attempting to use the application; and (ii) possibly based on the relationship between the first configuration item and the second configuration item, providing a second notification of the new record to the agent associated with the software program.

In some embodiments, the first configuration item is stored in a first configuration item table of a database, wherein the second configuration item is stored in a second configuration item table of the database, wherein the relationship is stored in a relationship table of the database, wherein receiving the indication that the change has been applied to the application or has been arranged to be applied to the application comprises searching the first configuration item table for the first configuration item, wherein identifying the relationship between the first configuration item and the second configuration item comprises searching the relationship table for relationships involving the first configuration item, and wherein providing the notification of the change to the agent associated with the software program comprises searching the second configuration item table for the second configuration item.

In some embodiments, the persistent storage also defines records of change requests related to the network, wherein receiving the indication that the change has been applied to the application or has been arranged to be applied to the application comprises receiving a change request that references the first configuration item.

In some embodiments, the persistent storage also defines a third configuration item representing an execution environment, and a second relationship between the second configuration item and the third configuration item, wherein the second relationship indicates that the software program executes within the execution environment.

In some embodiments, determining that the change can effect operation of the software program comprises determining that the change is related to an address of the application, an upgrade of the application, or a rollback of the application.

In some embodiments, providing the notification of the change to the agent associated with the software program comprises transmitting an email, text message, voice call, application-specific message, or web-based message to the agent.

Some embodiments may further involve generating and transmitting, to a client device, a visual representation of a graph, wherein the visual representation includes the first configuration item and the second configuration item as nodes of the graph and the relationship as an edge between the nodes.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid-state drives, or compact disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
receiving an indication that a change has been arranged to be applied to a robotic process automation deployed within a network, wherein persistent storage defines a first configuration item representing the robotic process automation, a second configuration item representing a software program that is deployable within the network, and a relationship between the first configuration item and the second configuration item, wherein the relationship indicates that the software program uses the robotic process automation;
in response to receiving the indication that the change has been arranged to be applied to the robotic process automation, identifying the relationship between the first configuration item and the second configuration item;
based on the relationship between the first configuration item and the second configuration item, determining that the change can affect operation of the software program, wherein determining that the change can affect operation of the software program comprises determining that the change is to a network address at which the robotic process automation is hosted; and
in response to determining that the change can affect operation of the software program, providing a notification of the change to an agent associated with the software program.

2. The computer-implemented method of claim 1, wherein the persistent storage also defines a third configuration item representing a second software program that is deployable within the network, and a second relationship between the first configuration item and the third configuration item, wherein the second relationship indicates that the second software program uses the robotic process automation and that the robotic process automation is used by the second software program, the computer-implemented method further comprising:
in response to receiving the indication that the change has been arranged to be applied to the robotic process automation, identifying the second relationship between the first configuration item and the third configuration item;
based on the second relationship between the first configuration item and the third configuration item, determining that the change can affect operation of the second software program; and
in response to determining that the change can affect operation of the second software program, providing a second notification of the change to a second agent associated with the second software program.

3. The computer-implemented method of claim 1, wherein the persistent storage also defines a third configuration item representing a second robotic process automation deployed within the network, and a second relationship between the second configuration item and the third configuration item, wherein the second relationship indicates that the software program uses the second robotic process automation and that the second robotic process automation is used by the software program, the computer-implemented method further comprising:
receiving a second indication that a second change has been arranged to be applied to the second robotic process automation;
in response to receiving the second indication that the second change has been arranged to be applied to the second robotic process automation, identifying the second relationship between the second configuration item and the third configuration item;
based on the second relationship between the second configuration item and the third configuration item, determining that the second change can affect operation of the software program; and
in response to determining that the second change can affect operation of the software program, providing a second notification of the second change to the agent associated with the software program.

4. The computer-implemented method of claim 1, wherein the persistent storage also defines records of incidents related to the network, the computer-implemented method further comprising:
receiving a new record of an incident related to the software program experiencing a failure when attempting to use the robotic process automation; and
based on the relationship between the first configuration item and the second configuration item, providing a second notification of the new record to a second agent associated with the robotic process automation.

5. The computer-implemented method of claim 1, wherein the persistent storage also defines records of incidents related to the network, the computer-implemented method further comprising:
   receiving a new record of an incident related to a failure when attempting to use the robotic process automation; and
   based on the relationship between the first configuration item and the second configuration item, providing a second notification of the new record to the agent associated with the software program.

6. The computer-implemented method of claim 1, wherein the persistent storage also defines records of change requests related to the network, and wherein receiving the indication that the change has been arranged to be applied to the robotic process automation comprises receiving a change request that references the first configuration item.

7. The computer-implemented method of claim 1, wherein the persistent storage also defines a third configuration item representing an execution environment, and a second relationship between the second configuration item and the third configuration item, and wherein the second relationship indicates that the software program executes within the execution environment.

8. A system comprising:
   persistent storage defining a first configuration item representing a robotic process automation deployed within a network, a second configuration item representing a software program that is deployable within the network, and a relationship between the first configuration item and the second configuration item, wherein the relationship indicates that the software program uses the robotic process automation;
   and one or more processors configured to:
      receive an indication that a change has been arranged to be applied to the robotic process automation;
      in response to receiving the indication that the change has been arranged to be applied to the robotic process automation, identify the relationship between the first configuration item and the second configuration item;
      based on the relationship between the first configuration item and the second configuration item, determine that the change can affect operation of the software program, wherein determining that the change can affect operation of the software program comprises determining that the change is to a network address at which the robotic process automation is hosted; and
      in response to determining that the change can affect operation of the software program, provide a notification of the change to an agent associated with the software program.

9. The system of claim 8, wherein the persistent storage also defines a third configuration item representing a second software program that is deployable within the network, and a second relationship between the first configuration item and the third configuration item, wherein the second relationship indicates that the second software program uses the robotic process automation and that the robotic process automation is used by the second software program, and wherein the one or more processors are further configured to:
   in response to receiving the indication that the change has been arranged to be applied to the robotic process automation, identify the second relationship between the first configuration item and the third configuration item;
   based on the second relationship between the first configuration item and the third configuration item, determine that the change can affect operation of the second software program; and
   in response to determining that the change can affect operation of the second software program, provide a second notification of the change to a second agent associated with the second software program.

10. The system of claim 8, wherein the persistent storage also defines a third configuration item representing a second robotic process automation deployed within the network, and a second relationship between the second configuration item and the third configuration item, wherein the second relationship indicates that the software program uses the second robotic process automation and that the second robotic process automation is used by the software program, and wherein the one or more processors are further configured to:
   receive a second indication that a second change has been arranged to be applied to the second robotic process automation;
   in response to receiving the second indication that the second change has been arranged to be applied to the second robotic process automation, identify the second relationship between the second configuration item and the third configuration item;
   based on the second relationship between the second configuration item and the third configuration item, determine that the second change can affect operation of the software program; and
   in response to determining that the second change can affect operation of the software program, provide a second notification of the second change to the agent associated with the software program.

11. The system of claim 8, wherein the persistent storage also defines records of incidents related to the network, and wherein the one or more processors are further configured to:
   receive a new record of an incident related to the software program experiencing a failure when attempting to use the robotic process automation; and based on the relationship between the first configuration item and the second configuration item, provide a second notification of the new record to a second agent associated with the robotic process automation.

12. The system of claim 8, wherein the persistent storage also defines records of incidents related to the network, and wherein the one or more processors are further configured to:
   receive a new record of an incident related to a failure when attempting to use the robotic process automation; and
   based on the relationship between the first configuration item and the second configuration item, provide a second notification of the new record to the agent associated with the software program.

13. The system of claim 8, wherein the first configuration item is stored in a first configuration item table of a database, wherein the second configuration item is stored in a second configuration item table of the database, wherein the relationship is stored in a relationship table of the database, wherein receiving the indication that the change has been arranged to be applied to the robotic process automation comprises searching the first configuration item table for the first configuration item, wherein identifying the relationship between the first configuration item and the second configuration item comprises searching the relationship table for relationships involving the first configuration item, and wherein providing the notification of the change to the agent associated with the software program comprises searching the second configuration item table for the second configuration item.

14. The system of claim 8, wherein the persistent storage also defines records of change requests related to the network, and wherein receiving the indication that the change has been arranged to be applied to the robotic process automation comprises receiving a change request that references the first configuration item.

15. The system of claim 8, wherein the persistent storage also defines a third configuration item representing an execution environment, and a second relationship between the second configuration item and the third configuration item, and wherein the second relationship indicates that the software program executes within the execution environment.

16. The system of claim 8, wherein providing the notification of the change to the agent associated with the software program comprises transmitting an email, text message, voice call, application-specific message, or web-based message to the agent.

17. The system of claim 8, wherein the one or more processors are further configured to:
  generate and transmit, to a client device, a visual representation of a graph, wherein the visual representation includes the first configuration item and the second configuration item as nodes of the graph and the relationship as an edge between the nodes.

18. An article of manufacture including a non-transitory computer-readable medium, having stored thereon program instructions that, upon execution by a computing system, cause the computing system to perform operations comprising:
  receiving an indication that a change has been arranged to be applied to a robotic process automation deployed within a network, wherein persistent storage defines a first configuration item representing the robotic process automation, a second configuration item representing a software program that is deployable within the network, and a relationship between the first configuration item and the second configuration item, wherein the relationship indicates that the software program uses the robotic process automation;
  in response to receiving the indication that the change has been arranged to be applied to the robotic process automation, identifying the relationship between the first configuration item and the second configuration item;
  based on the relationship between the first configuration item and the second configuration item, determining that the change can affect operation of the software program, wherein determining that the change can affect operation of the software program comprises determining that the change is to a network address at which the robotic process automation is hosted; and
  in response to determining that the change can affect operation of the software program, providing a notification of the change to an agent associated with the software program.

* * * * *